United States Patent
Perry et al.

(10) Patent No.: US 8,091,342 B2
(45) Date of Patent: Jan. 10, 2012

(54) TECHNIQUE FOR PRODUCTION OF AMMONIA ON DEMAND IN A THREE WAY CATALYST FOR A PASSIVE SELECTIVE CATALYTIC REDUCTION SYSTEM

(75) Inventors: Kevin L. Perry, Fraser, MI (US); David J. Cleary, Shanghai (CN); Kushal Narayanaswamy, Sterling Heights, MI (US); Paul M. Najt, Bloomfield Hills, MI (US); Wei Li, Troy, MI (US); James Donald Smith, Ann Arbor, MI (US); Chang H Kim, Rochester, MI (US); Thompson M. Sloane, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 530 days.

(21) Appl. No.: 12/360,901

(22) Filed: Jan. 28, 2009

(65) Prior Publication Data
US 2010/0186390 A1  Jul. 29, 2010

(51) Int. Cl.
*F01N 3/00* (2006.01)
(52) U.S. Cl. .......... 60/286; 60/274; 60/295; 60/301; 60/303; 123/295; 123/303; 123/698
(58) Field of Classification Search .......... 60/274, 60/286, 295, 297, 301, 303; 123/295, 300, 123/305, 698
See application file for complete search history.

(56) References Cited

U.S. PATENT DOCUMENTS

| | | | | |
|---|---|---|---|---|
| 6,345,496 B1* | 2/2002 | Fuwa et al. | ...................... | 60/274 |
| 7,152,573 B2* | 12/2006 | Abet et al. | ...................... | 123/299 |
| 7,204,081 B2* | 4/2007 | Yasui et al. | ...................... | 60/286 |
| 7,731,925 B2* | 6/2010 | Gloeckle | ...................... | 423/213.2 |
| 7,814,747 B2* | 10/2010 | Bandl-Konrad et al. | ....... | 60/297 |

OTHER PUBLICATIONS

U.S. Appl. No. 12/360,908, Najt, et al.
U.S. Appl. No. 12/390,588, Narayanaswamy, et al.
U.S. Appl. No. 12/329,162, Perry, et al.
U.S. Appl. No. 12/330,587, Najt, et al.
U.S. Appl. No. 12/624,709, Li, et al.
U.S. Appl. No. 12/576,412, Perry, et al.
U.S. Appl. No. 12/430,819, Brinkman, et al.
Ogunwumi, S., In-Situ NH3 Generation for SCR NOx Applications, SAE 2002-01-2872, 2002, SAE International, San Diego, CA.
Nakahira, T., "Catalytic Engine" NOx Reduction of Diesel Engine with New Concept Onboard Ammonia Synthesis System, SAE 920469, 1992, SAE International, Detroit, MI.

* cited by examiner

*Primary Examiner* — Binh Q Tran

(57) ABSTRACT

A method for controlling a powertrain includes selectively initiating an ammonia generation cycle, including injecting fuel into a combustion chamber of an engine before a primary combustion event to a calibrated air fuel ratio in a range lean of stoichiometry based upon generation of NOx within the combustion chamber, injecting fuel into the combustion chamber after the primary combustion event based upon an overall air fuel ratio in a range rich of stoichiometry and resulting generation of molecular hydrogen, and utilizing a catalyst device between the engine and a selective catalytic reduction device to produce ammonia.

28 Claims, 15 Drawing Sheets

| AVERAGE CONCENTRATIONS (% or ppm): | | | | | | | A/F = +/-0.25 SO2 = 2.7ppm | | |
|---|---|---|---|---|---|---|---|---|---|
| Ideal Average A/F | Calculated Average A/F | Calculated Average Lamda | Bank A/B % O2 | Bank A/B % CO | Bank A/B % H2 | Bank A/B ppm HC | Bank C ppm NO | Bank C % CO2 | Bank C % H2O |
| 14.20 | 14.178 | 0.952 | 0.286 | 1.442 | 0.481 | 614 | 898 | 10.0 | 5.0 |
| 14.30 | 14.276 | 0.960 | 0.309 | 1.276 | 0.426 | 679 | 913 | 10.0 | 5.0 |
| 14.40 | 14.369 | 0.967 | 0.330 | 1.123 | 0.374 | 542 | 924 | 10.0 | 5.0 |
| 14.50 | 14.458 | 0.988 | 0.418 | 0.732 | 0.244 | 416 | 930 | 10.0 | 5.0 |
| 14.60 | 14.543 | 0.994 | 0.451 | 0.636 | 2.212 | 381 | 933 | 10.0 | 5.0 |
| 14.70 | 14.628 | 1.000 | 0.491 | 0.550 | 0.183 | 347 | 932 | 10.0 | 5.0 |
| 14.80 | 14.712 | 1.006 | 0.538 | 0.475 | 0.158 | 314 | 927 | 10.0 | 5.0 |

*FIG. 5*

Simplified
Two-zone Combustion Model

TECHNIQUE FOR PRODUCTION OF AMMONIA ON DEMAND IN A THREE WAY CATALYST FOR A PASSIVE SELECTIVE CATALYTIC REDUCTION SYSTEM

TECHNICAL FIELD

This disclosure is related to control of aftertreatment of NOx emissions in internal combustion engines.

BACKGROUND

The statements in this section merely provide background information related to the present disclosure and may not constitute prior art.

Emissions control is an important factor in engine design and engine control. Oxides of nitrogen, NOx, are known by-products of combustion. NOx is created by nitrogen and oxygen molecules present in engine intake air disassociating in the high temperatures of combustion, and rates of NOx creation include known relationships to the combustion process, for example, with higher rates of NOx creation being associated with higher combustion temperatures and longer exposure of air molecules to the higher temperatures. Reduction of NOx created in the combustion process and management of NOx in an exhaust aftertreatment system are priorities in vehicle design.

NOx molecules, once created in the combustion chamber, can be converted back into nitrogen and oxygen molecules in exemplary devices known in the art within the broader category of aftertreatment devices. However, one having ordinary skill in the art will appreciate that aftertreatment devices are largely dependent upon operating conditions, such as device operating temperature driven by exhaust gas flow temperatures and engine air/fuel ratio. Additionally, aftertreatment devices include materials, such as catalyst beds, prone to damage or degradation as a result of use over time and exposure to high temperatures.

Modern engine control methods utilize diverse operating strategies to optimize combustion. Some operating strategies, optimizing combustion in terms of fuel efficiency, include lean, localized, or stratified combustion within the combustion chamber in order to reduce the fuel charge necessary to achieve the work output required of the cylinder and increase engine efficiency, for example, by operating in an unthrottled condition, reducing air intake pumping losses. While temperatures in the combustion chamber can get high enough in pockets of combustion to create significant quantities of NOx, the overall energy output of the combustion chamber, in particular, the heat energy expelled from the engine through the exhaust gas flow, can be greatly reduced from normal values. Such conditions can be challenging to exhaust aftertreatment strategies, since, as aforementioned, aftertreatment devices frequently require an elevated operating temperature, driven by the exhaust gas flow temperature, to operate adequately to treat NOx emissions.

Aftertreatment devices are known, for instance, utilizing chemical reactions to treat exhaust gas flow. One exemplary device includes a selective catalytic reduction device (SCR). Known uses of an SCR device utilize ammonia derived from urea injection to treat NOx. Ammonia stored on a catalyst bed within the SCR reacts with NOx, preferably in a desired proportion of NO and $NO_2$, and produces favorable reactions to treat the NOx. One exemplary embodiment includes a preferred one to one, NO to $NO_2$ proportion, and is known as a fast SCR reaction. It is known to operate a diesel oxidation catalyst (DOC) upstream of the SCR in diesel applications to convert NO into NO2 for preferable treatment in the SCR. Continued improvement in exhaust aftertreatment requires accurate information regarding NOx emissions in the exhaust gas flow in order to achieve effective NOx reduction, such as dosing proper amount of urea based on monitored NOx emissions.

Other aftertreatment devices are additionally known for treating the exhaust gas flow. Three way catalysts (TWC) are utilized particularly in gasoline applications. Lean NOx traps (NOx trap) utilize catalysts capable of storing some amount of NOx, and engine control technologies have been developed to combine these NOx traps or NOx adsorbers with fuel efficient engine control strategies to improve fuel efficiency and still achieve acceptable levels of NOx emissions. One exemplary strategy includes using a lean NOx trap to store NOx emissions during fuel lean operations and then purging the stored NOx during fuel rich, higher temperature engine operating conditions with conventional three-way catalysis to nitrogen and water. Diesel particulate filters (DPF) trap soot and particulate matter in diesel applications, and the trapped material is periodically purged in high temperature regeneration events.

Urea injection in a powertrain can be problematic. Urea storage and replenishment can be difficult to maintain. Urea is prone to freeze under normally varying climatic conditions in common regions.

SUMMARY

A powertrain includes an internal combustion engine having a combustion chamber and an aftertreatment system having a selective catalytic reduction device utilizing ammonia as a reductant. A method for controlling the powertrain includes selectively initiating an ammonia generation cycle, including injecting fuel into a combustion chamber of an engine before a primary combustion event to a calibrated air fuel ratio in a range lean of stoichiometry based upon generation of NOx within the combustion chamber, injecting fuel into the combustion chamber after the primary combustion event based upon an overall air fuel ratio in a range rich of stoichiometry and resulting generation of molecular hydrogen, and utilizing a catalyst device between the engine and a selective catalytic reduction device to produce ammonia.

BRIEF DESCRIPTION OF THE DRAWINGS

One or more embodiments will now be described, by way of example, with reference to the accompanying drawings, in which:

FIG. 5 shows a table of sample reaction mixtures that were introduced into the first chemical reactor, in accordance with the present disclosure;

FIG. 12 illustrates hydrogen and NO production at two different measured overall AFR) values;

FIG. 13 illustrates hydrogen production per incremental increase in fuel at two different AFR values;

FIG. 15 depicts hydrogen and NOx production varying depending upon engine load;

FIG. 16 depicts hydrogen production and variation based upon engine load;

FIG. 17 depicts an arrangement of 4 stages of catalysts, including a particulate filter device with stage 1 and stage 2 catalysts coated on inlet and exit channels of the filter, respectively;

FIG. 18 depicts an arrangement of 4 stages of catalysts, with stage 1 and stage 2 catalysts coated on a single element within a single device;

FIG. 19 depicts an arrangement of 4 stages of catalysts, wherein stage 1 catalysts are arranged immediately after and within a single device with a particulate filter;

FIG. 20 depicts an arrangement similar to FIG. 19, except that the stage 1 catalyst is located within the particulate filter, for example, as a surface coating within the device;

FIG. 21 depicts and arrangement of 4 stages of catalysts, wherein a stage 3 catalyst, performing a role of an SCR, is located within a particulate filter;

DETAILED DESCRIPTION

Figure 1:
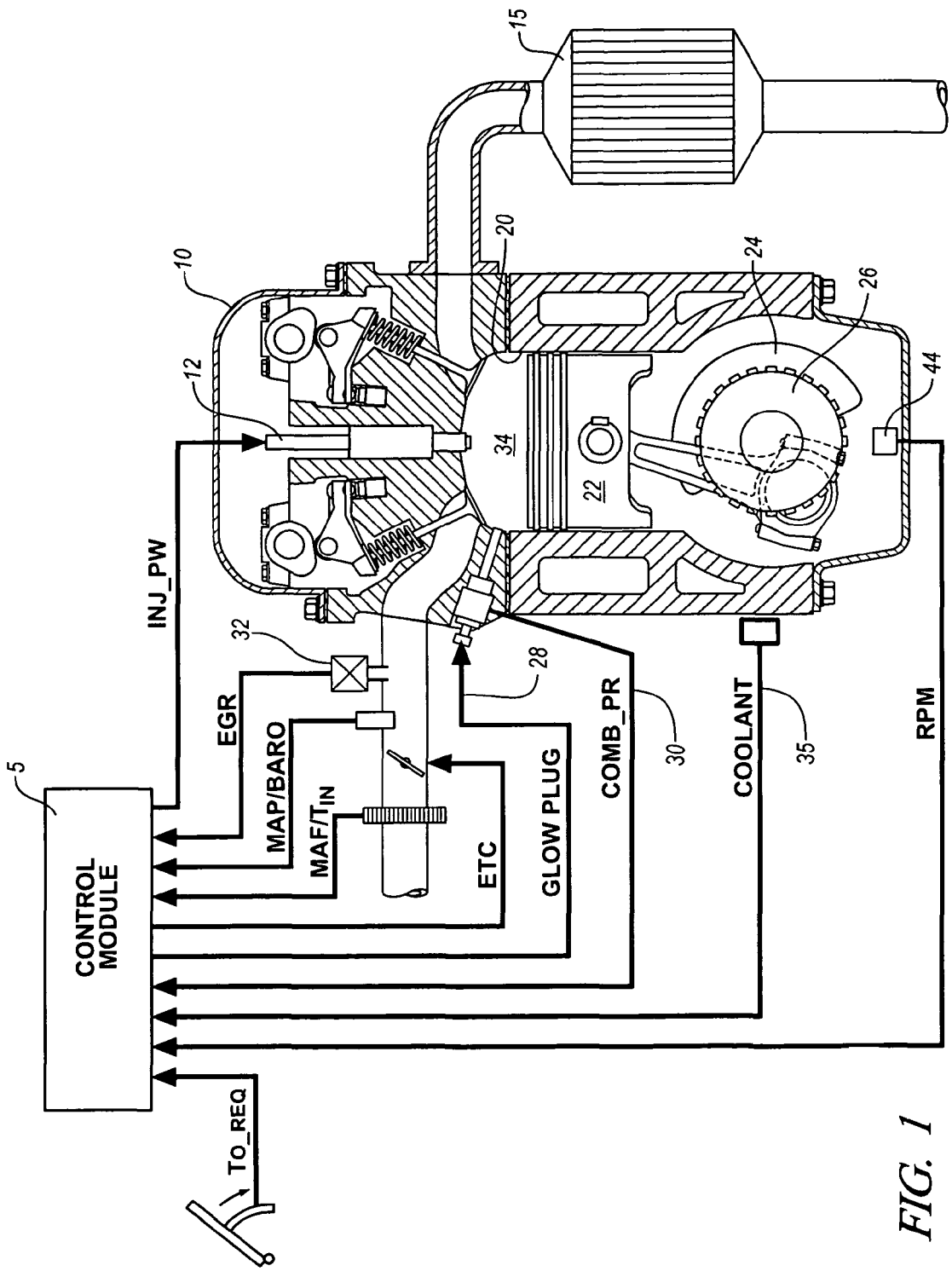
FIG. 1 is a schematic diagram depicting an internal combustion engine, a control module, and an exhaust aftertreatment system, in accordance with the present disclosure.

Referring now to the drawings, wherein the showings are for the purpose of illustrating certain exemplary embodiments only and not for the purpose of limiting the same, FIG. 1 is a schematic diagram depicting an internal combustion engine 10 and control module 5, and exhaust aftertreatment system 15, in accordance with the present disclosure. The exemplary engine comprises a multi-cylinder, direct-injection internal combustion engine having reciprocating pistons 22 attached to a crankshaft 24 and movable in cylinders 20 which define variable volume combustion chambers 34. Engines are known to operate under compression ignition or spark ignition. Additionally, methods are known to utilize either ignition strategy in a single engine, modulating strategy based upon factors such as engine speed and load. Additionally, engines are known to operate in hybrid strategies, such as spark assisted, compression ignition strategies. This disclosure is intended to include these exemplary embodiments of engine operation, but is not intended to be limited thereto. The crankshaft 24 is operably attached to a vehicle transmission and driveline to deliver tractive torque thereto, in response to an operator torque request ($T_{O\_REQ}$). The engine preferably employs a four-stroke operation wherein each engine combustion cycle comprises 720 degrees of angular rotation of crankshaft 24 divided into four 180-degree stages of intake-compression-expansion-exhaust, which are descriptive of reciprocating movement of the piston 22 in the engine cylinder 20. A multi-tooth target wheel 26 is attached to the crankshaft and rotates therewith. The engine includes sensing devices to monitor engine operation, and actuators which control engine operation. The sensing devices and actuators are signally or operatively connected to control module 5.

The engine preferably comprises a direct-injection, four-stroke, internal combustion engine including a variable volume combustion chamber defined by the piston reciprocating within the cylinder between top-dead-center and bottom-dead-center points and a cylinder head comprising an intake valve and an exhaust valve. The piston reciprocates in repetitive cycles each cycle comprising intake, compression, expansion, and exhaust strokes.

The engine preferably has an air/fuel operating regime that is primarily lean of stoichiometry. One having ordinary skill in the art understands that aspects of the invention are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. The charge is subsequently combusted by action of compression thereof or with the initiation of spark from a spark plug during the compression stroke.

The engine is adapted to operate over a broad range of temperatures, cylinder charge (air, fuel, and, EGR) and injection events. The methods described herein are particularly suited to operation with direct-injection engines operating lean of stoichiometry to determine parameters which correlate to heat release in each of the combustion chambers during ongoing operation. The methods defined herein are applicable to multiple engine configurations, including spark-ignition engines, compression-ignition engines including those adapted to use homogeneous charge compression ignition (HCCI) strategies. The methods are applicable to systems utilizing multiple fuel injection events per cylinder per engine cycle, e.g., a system employing a pilot injection for fuel reforming, a main injection event for engine power, and, where applicable, a post-combustion fuel injection, a late-combustion fuel injection event for aftertreatment management, each which affects cylinder pressure.

Sensing devices are installed on or near the engine to monitor physical characteristics and generate signals which are correlatable to engine and ambient parameters. The sensing devices include a crankshaft rotation sensor, comprising a crank sensor 44 for monitoring crankshaft speed (RPM) through sensing edges on the teeth of the multi-tooth target wheel 26. The crank sensor is known, and may comprise, e.g., a Hall-effect sensor, an inductive sensor, or a magnetoresistive sensor. Signal output from the crank sensor 44 (RPM) is input to the control module 5. There is a combustion pressure sensor 30, comprising a pressure sensing device adapted to monitor in-cylinder pressure (COMB_PR). The combustion pressure sensor 30 preferably comprises a non-intrusive device comprising a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the sensor 30. The output signal, COMB_PR, of the sensing element of sensor 30 is proportional to cylinder pressure. The sensing element of sensor 30 comprises a piezoceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature ($T_{IN}$), and, a coolant sensor 35 (COOLANT). The system may include an exhaust gas sensor (not shown) for monitoring states of one or more exhaust gas parameters, e.g., temperature, air/fuel ratio, and constituents. One having ordinary skill in the art understands that there may other sensing devices and methods for purposes of control and diagnostics. The operator input, in the form of the operator torque request, $T_{O\_REQ}$, is typically obtained through a throttle pedal and a brake pedal, among other devices. The engine is preferably equipped with other sensors (not shown) for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms and still fall within the scope of the invention.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request ($T_{O\_REQ}$). There is an exhaust gas recirculation valve 32 and cooler (not shown), which controls flow of externally recirculated exhaust gas to the engine intake, in response to a control signal (EGR) from the control module. The glow-plug 28 comprises a known device, installed in each of the combustion chambers, adapted for use with the combustion pressure sensor 30.

The fuel injector 12 is an element of a fuel injection system, which comprises a plurality of high-pressure fuel injector devices each adapted to directly inject a fuel charge, comprising a mass of fuel, into one of the combustion chambers in response to the command signal, INJ_PW, from the control module. Each of the fuel injectors 12 are supplied pressurized fuel from a fuel distribution system (not shown), and have operating characteristics including a minimum pulsewidth and an associated minimum controllable fuel flow rate, and a maximum fuel flowrate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the desired functions. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift, on systems so equipped. The control module is adapted to receive input signals from the operator (e.g., a throttle pedal position and a brake pedal position) to determine the operator torque request, $T_{O\_REQ}$, and from the sensors indicating the engine speed (RPM) and intake air temperature ($T_{IN}$), and coolant temperature and other ambient conditions.

FIG. 1 describes an exemplary gasoline engine. However, it will be appreciated that NOx treatment and aftertreatment systems are utilized in other engine configurations including diesel engines, and the disclosure is not intended to be limited to the specific exemplary engine embodiment described herein.

Figure 2:
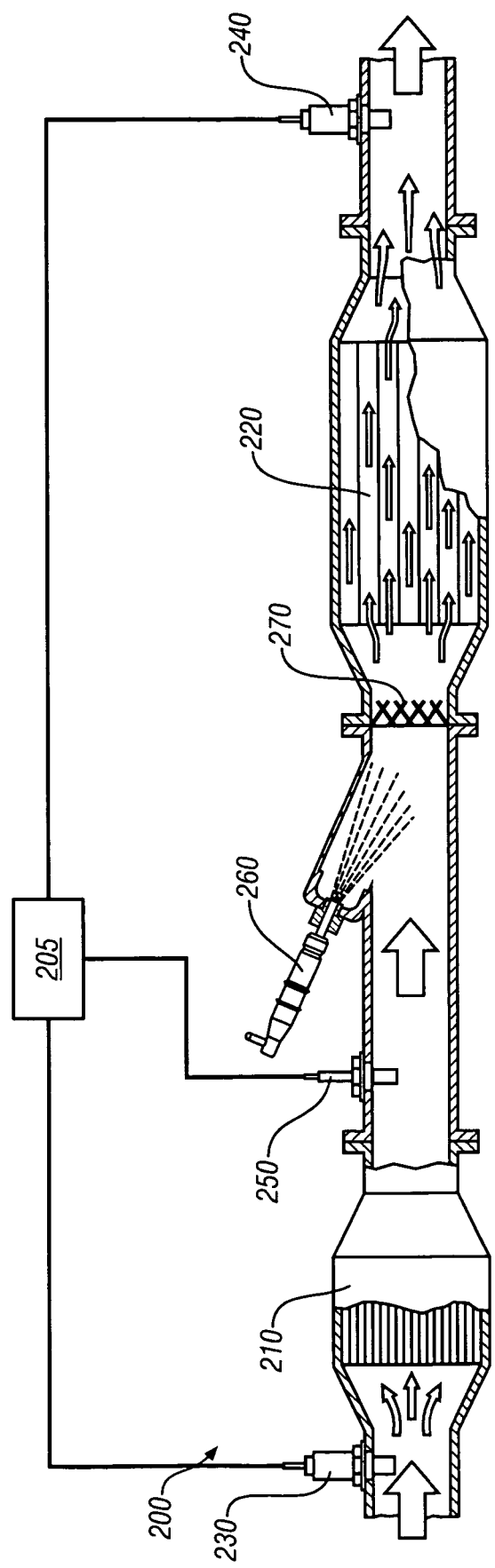
FIG. 2 schematically illustrates an exemplary aftertreatment system including a urea dosing configuration, in accordance with the present disclosure.

FIG. 2 schematically illustrates an exemplary aftertreatment system including a urea dosing configuration, in accordance with the present disclosure. Aftertreatment system 200 comprises a control module 205, DOC 210, SCR 220, upstream NOx sensor 230, downstream NOx sensor 240, temperature sensor 250, and urea dosing module 260. As is known in the art, DOC 210 performs a number of catalytic functions necessary to aftertreatment of an exhaust gas flow. One of the functions of DOC 210 is to convert NO, a NOx species not easily treated in an SCR, into $NO_2$, a NOx species easily treated in an SCR. SCR 220 utilizes urea as a reactant to reduce NOx into other molecules. Upstream NOx sensor 230 detects and quantifies NOx in the exhaust gas flow entering aftertreatment system 200. While upstream NOx sensor 230 is illustrated as an exemplary means to quantify NOx entering the aftertreatment system, it should be noted that NOx entering the system can be quantified for use in evaluating conversion efficiency in an SCR by other means, for example, through a NOx sensor located between DOC 210 and SCR 220 or through a virtual NOx sensor modeling engine output and conditions within the exhaust gas flow to estimate the presence of NOx entering the aftertreatment system. This disclosure in general discusses a sensor input describing NOx entering the aftertreatment system in accordance with the exemplary embodiment, however it will be appreciated that, depending upon upstream sensor placement, the input could actually describe NOx content entering a portion of the aftertreatment system. SCR 220 utilizes ammonia, for example, as derived from injected urea, to convert NOx to other molecules by methods known in the art. Temperature sensor 250 is depicted, located in a region to gather exhaust gas flow temperatures within the aftertreatment system 200. Urea dosing module 260 is depicted in a position upstream of SCR 220. The urea can be directly sprayed into the exhaust gas flow entering the SCR. However, a preferred method is depicted, utilizing a mixer device 270. Urea dosing module 260 injects urea onto mixer device 270, and the urea is then carried by the exhaust gas flow in a substantially even distribution onto the catalyst surfaces on the interior of SCR 220. Downstream NOx sensor 240 detects and quantifies NOx in the exhaust gas flow exiting aftertreatment system 200. Control module 205 includes programming required to process inputs related to the aftertreatment system and can include programming to employ methods described herein.

Ammonia as a reductant can be introduced as described above through injection of urea into the aftertreatment system. However, storage and maintaining adequate levels of urea in a mobile or consumer owned powertrain can be problematic. One having ordinary skill in the art will appreciate that ammonia is a known by-product of the combustion and aftertreatment process. Known methods optimize the combustion process and use of aftertreatment devices to reduce the occurrence of ammonia so as not to incur another substance that must be converted. A method is disclosed to instead selectively attenuate operation of the combustion cycle and utilize aftertreatment devices conducive to periodically producing ammonia in an ammonia generation cycle and to store this ammonia for subsequent NOx conversion.

Ammonia can be produced in a catalyst device, such as a TWC device. Such production of ammonia ($NH_3$) results from an exemplary conversion process described by the following equation.

$$NO+CO+1.5H_2 \rightarrow NH_3+CO_2 \qquad [1]$$

One having ordinary skill in the art will appreciate that this conversion requires molecular oxygen to be depleted from the catalyst before NO will react with the molecular hydrogen. Excess oxygen is frequently present when the internal combustion engine is operated in lean operating modes, with the air/fuel ratio (AFR) operated lean of stoichiometry or with excess air. As a result, utilizing a selectable ammonia generation cycle requires control of AFR to a value determined to deplete oxygen in the exhaust gas flow. Further, selection of an AFR within the stoichiometric and rich operating ranges further facilitate the production of ammonia, for example, by producing NO and $H_2$ in appropriate quantities. In the exemplary equation above, an ideal ratio of 1.5 to one is evident. However, based upon the environment provided by the catalyst and other reactions taking place within the aftertreatment device, a different actual ratio can create optimal production of ammonia. An exemplary test value utilizing a particular exemplary catalyst was determined to operate optimally at a ratio of between three and five hydrogen molecules to one NO molecule. Selection of a catalyst enabling lower ratios of hydrogen to NO are preferable, as hydrogen requirements directly relate to an amount of fuel that must be consumed to enable ammonia production. Calibration according to test results or modeling according to methods sufficient to accurately estimate operation of the combustion cycle and aftertreatment processes and conversions can be utilized to select an AFR useful to control an ammonia generation cycle. One having ordinary skill in the art will appreciate that CO presence must also be considered to facilitate the reaction described above.

Operation of an ammonia generation cycle can be controlled or selected according to a number of factors affecting ammonia usage within the SCR device, including estimated ammonia storage on the catalyst, estimated or detected ammonia slip, estimated or detected NOx breakthrough past the SCR device, and engine operation conducive to operating in an ammonia generation cycle. Monitoring of these factors can be accomplished through monitoring a number of inputs, including engine operation, exhaust gas properties, and NOx conversion efficiency within the SCR device. Periods of engine acceleration have been shown to include normally higher levels of NOx and hydrogen production and AFR closer to stoichiometric. Such periods conducive to ammonia generation can be utilized to minimize intrusive operation of an ammonia generation cycle under less conducive engine operation. Length of operation of an ammonia generation cycle will vary depending upon required ammonia production, the particulars of the system employed, and the particular operation of the engine.

Molecular hydrogen production, required for generation of ammonia, can occur in the engine through the combustion process. Combustion in an AFR rich environment, wherein molecular oxygen is scarce, tends to produce elevated levels of molecular hydrogen. The hydrogen production can occur as the result of a single injection combustion cycle, with hydrogen generation resulting from a primary combustion event that provides work output to the engine.

Figure 3:
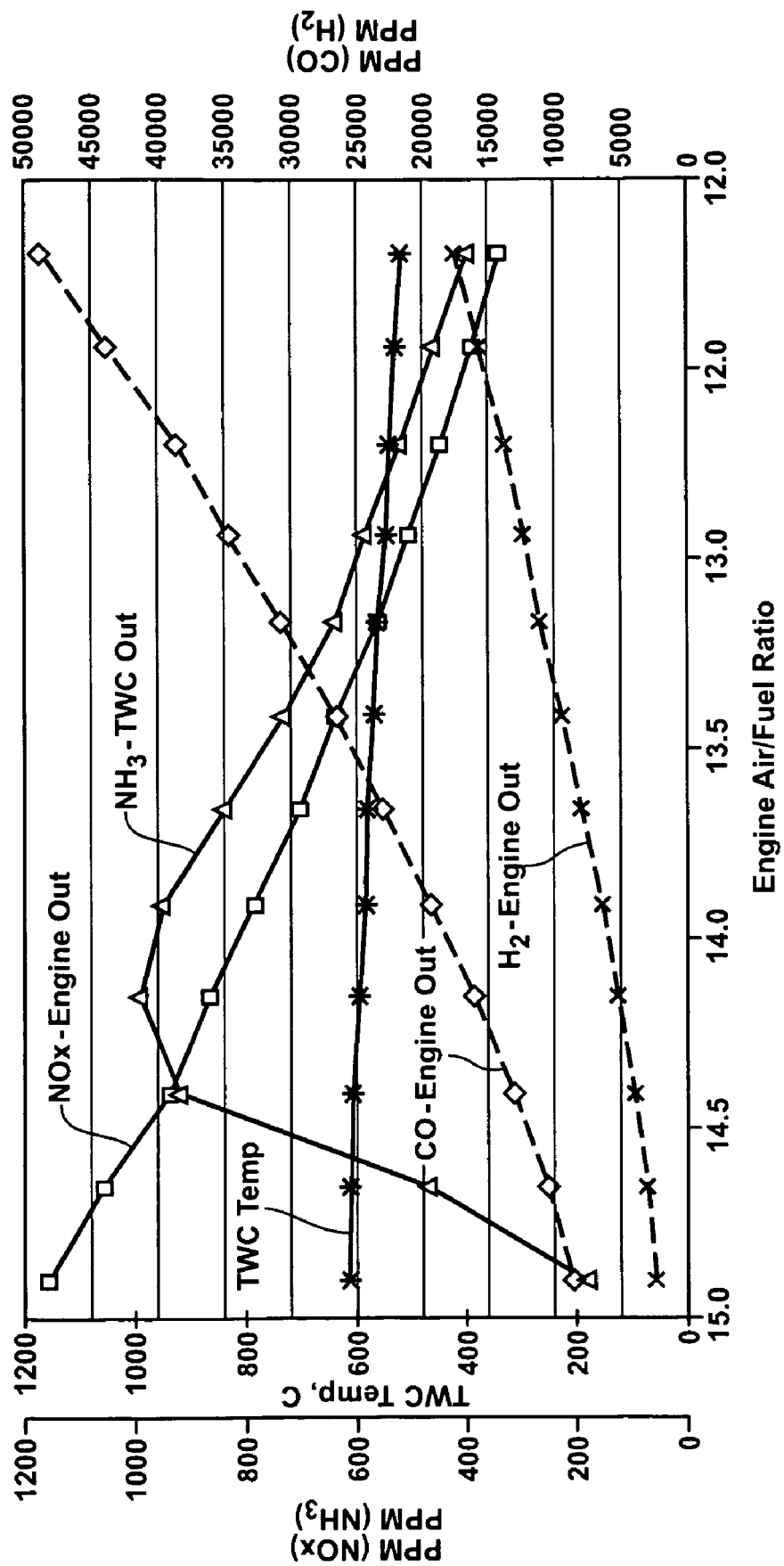
FIG. 3 graphically illustrates exemplary operation of an engine and resulting generation of a number of chemical compounds within an exhaust gas flow including ammonia through various air fuel ratios, in accordance with the present disclosure.

FIG. 3 graphically illustrates exemplary operation of an engine and resulting generation of a number of chemical compounds within an exhaust gas flow including ammonia through various air fuel ratios through single injection combustion cycle, in accordance with the present disclosure. The exemplary test results depict operation of an engine on a dynamometer utilizing lean-burn spark-ignition direct-injection combustion operating at a speed of 2000 RPM and a load of 2 bar. As described above, changing AFR changes the chemical composition of the exhaust gas flow. Stoichiometric operation is known to occur in gasoline engines at an AFR of approximately 14.7 to one. AFR values greater than 14.7 describe lean operation or operation with excess air. AFR values less than 14.7 describe rich operation or operation with excess fuel. In the exemplary dataset of FIG. 3, NOx exiting the engine is shown to decrease with decreasing AFR, and $H_2$ exiting the engine is shown to increase with decreasing AFR. Resulting presence of $NH_3$ exiting the TWC is shown to increase initially, peak at an exemplary value of approximately 14.2, and subsequently decrease with decreasing AFR. As a result, in the exemplary configuration including the particular catalyst utilized in generating the dataset depicted in FIG. 3, an ammonia generation cycle can be best operated at an AFR equal to 14.2. However, as described above, different configurations and in particular different catalysts can change the ratio of hydrogen and NOx to best facilitate ammonia production. As a result, the selected AFR can vary from the 14.2 value given in the above example.

Figure 4:
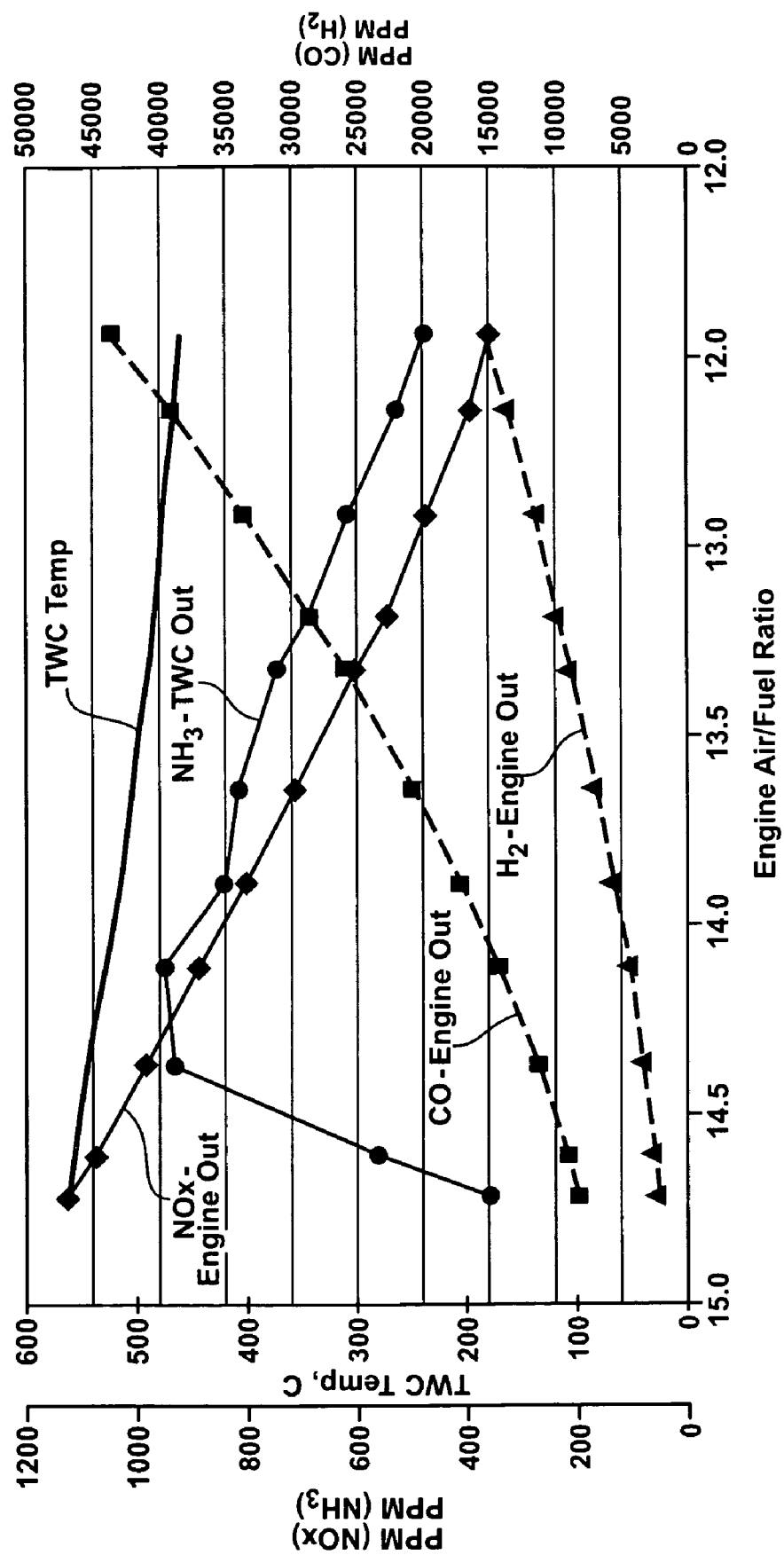
FIG. 4 graphically illustrates an additional example of operation of an engine and resulting generation of a number of chemical compounds within an exhaust gas flow including ammonia through various air fuel ratios, in accordance with the present disclosure.

FIG. 4 graphically illustrates an additional example of operation of an engine and resulting generation of a number of chemical compounds within an exhaust gas flow including ammonia through various air fuel ratios through single injection combustion cycle, in accordance with the present disclosure. The exemplary test results depict operation of an engine on a dynamometer utilizing lean-burn spark-ignition direct-injection combustion operating at a speed of 1500 RPM and a load of 1 bar. As described above in association with FIG. 3, FIG. 4 depicts ammonia production through a range of AFR values. Ammonia production again peaks at some AFR value and is controlled in part by presence of molecular hydrogen and NOx. In the exemplary test results of FIG. 4, the peak value of ammonia production occurs at an AFR value of approximately 14.2. This value as described above is dependent upon the properties of the catalyst utilized.

FIGS. 5-8 graphically illustrate test results utilizing single injection to form ammonia and depict reactants introduced to a first chemical reactor comprising a first TWC brick and a second TWC brick configured to simulate TWC devices in a vehicle exhaust stream. FIG. 5 shows a table of sample reaction mixtures that were introduced into the first chemical reactor, in accordance with the present disclosure. Each sample reaction mixture comprise levels of component gases determined based on engine models simulating exhaust gas compositions at selected engine air fuel ratios. The ideal average air fuel ratio (Ideal Average A/F) is the targeted engine air fuel ratio that would produce exhaust gas compositions correlating to the sample reaction mixtures based on the engine models. The calculated average air fuel ratio (Calculated Average A/F) is the achieved modeled air fuel ratio based upon the actual reactant measurements. The calculated average lambda (Calculated Average Lambda) is the lambda value for the calculated average air fuel ratio. The amounts of oxygen (% O2), carbon monoxide (% CO), hydrogen (% H2), carbon dioxide (% CO2), water (% H2O) hydrocarbons (ppm HC) and nitric oxide (% NO) included in each sample reaction mixture was measured. Further, each sample reaction mixture includes sulfur dioxide level (SO2) of 2.7 ppm.

Figure 6:
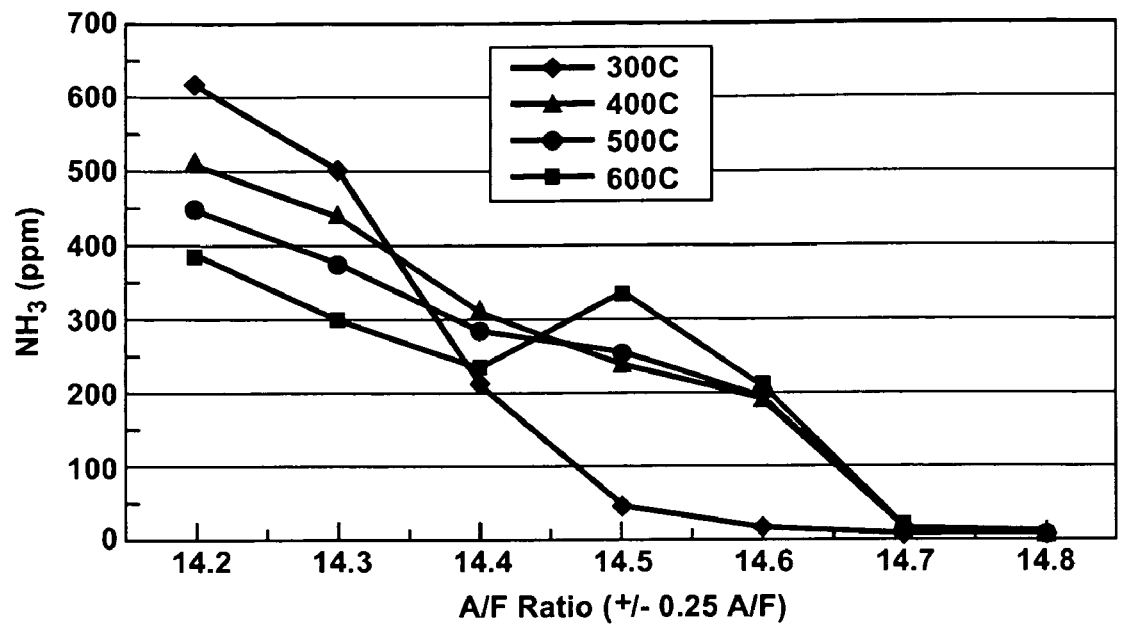
FIG. 6 graphically depicts ammonia production levels through a range of air fuel ratios and reaction temperatures, in accordance with the present disclosure.

FIG. 6 graphically depicts ammonia production levels through a range of air fuel ratios and reaction temperatures, in accordance with the present disclosure. The graph depicts ammonia levels (NH3 (ppm)) generated by the first chemical reactor at target air fuel ratios (A/F Ratio (+/−0.25 A/F), and at reaction temperatures of 300 C, 400 C, 500 C, and 600 C. For each reaction temperature, the highest ammonia levels were generated at the target air fuel ratio of 14.2 and generally declines as air fuel ratio increases. Further, ammonia levels decrease with increasing reaction temperature from 300 C to 600 C at the target air fuel ratio of 14.2.

Figure 7:
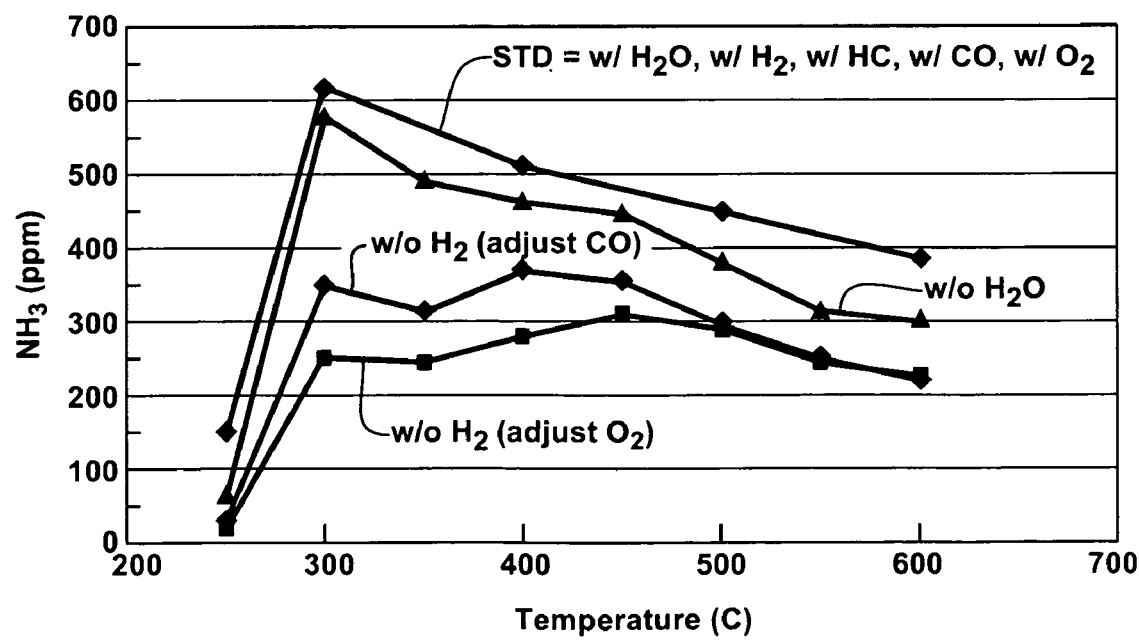
FIG. 7 graphically depicts ammonia levels generated by a first chemical reactor utilizing a standard reaction mixture and modified reaction mixtures versus temperature, in accordance with the present disclosure.

FIG. 7 graphically depicts ammonia levels (NH3 (ppm)) generated by the first chemical reactor utilizing a standard reaction mixture (STD=w/$H_2O$, w/$H_2$, w/HC, w/CO w/$O_2$) and modified reaction mixtures versus temperature (Temperature C), in accordance with the present disclosure. The standard reaction mixture includes water, hydrogen, hydrocarbon, carbon monoxide, and oxygen in amounts listed for the sample reaction mixture having a target air fuel ratio of 14.2 in the table of FIG. 5. The modified reaction mixtures include a sample reaction mixture comprising component amounts of the standard reaction mixture but without water (w/o $H_2O$), a sample reaction mixture comprising components amounts of the standard reaction mixture but with increased levels of carbon monoxide in place of hydrogen (w/o $H_2$ (adjust CO)), and a sample reaction mixture comprising component amounts of the standard mixture but with increased levels of oxygen in place of hydrogen (w/o $H_2$ (adjust $O_2$)).

Figure 8:
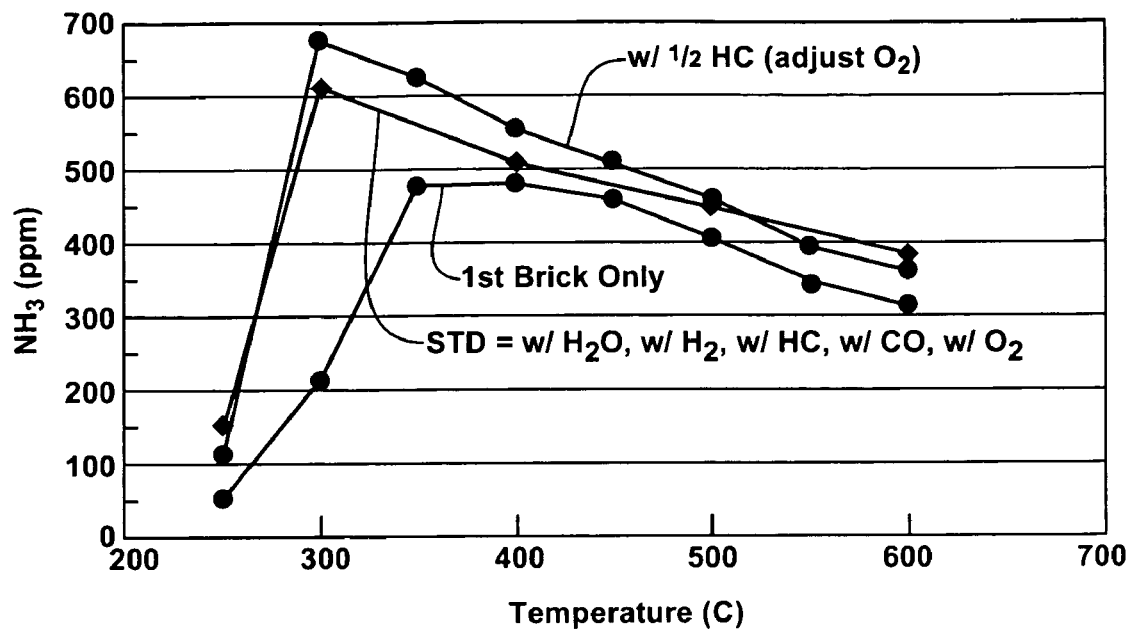
FIG. 8 graphically depicts ammonia levels generated by the first chemical reactor utilizing the standard reaction mixture and a modified reaction mixture versus temperature, in accordance with the present disclosure.

FIG. 8 graphically depicts ammonia levels (NH3 (ppm)) generated by the first chemical reactor utilizing the standard reaction mixture (STD=w/$H_2O$, w/$H_2$, w/HC, w/CO w/$O_2$) and a modified reaction mixture versus temperature (Temperature C), in accordance with the present disclosure. The standard reaction mixture includes water, hydrogen, hydrocarbon, carbon monoxide, and oxygen in amounts listed for the sample reaction mixture having a target air fuel ratio of 14.2 in the table of FIG. 5. The modified reaction mixtures include a sample reaction mixture comprising component amounts of the standard reaction mixture but with oxygen in place of one half the amount of hydrocarbon (w/½ HC (adjust $O_2$)). FIG. 8 further depicts ammonia generated by a second chemical reactor utilizing the standard reaction mixture ($1^{st}$ Brick Only), wherein the second reactor only comprises a first TWC brick without additional TWC bricks.

Figure 9:
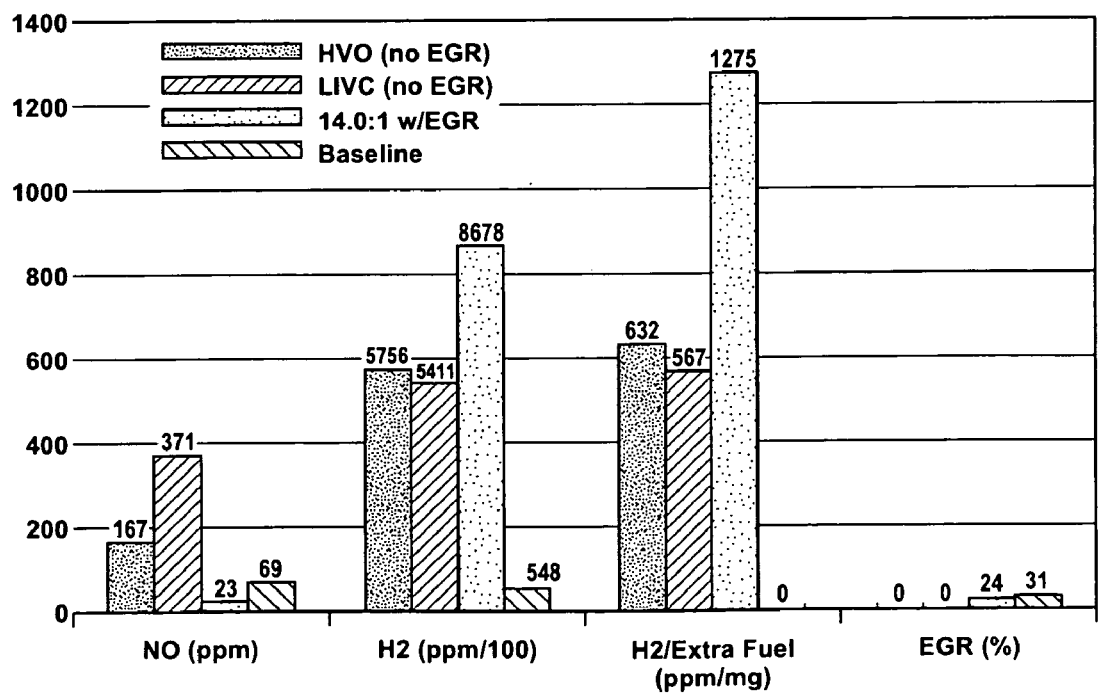
FIG. 9 graphically illustrates four different exemplary engine control strategies and resulting engine emissions under a fixed set of operating conditions, in accordance with the present disclosure.

Both hydrogen production and NOx production in a single injection combustion cycle can be modulated in a number of ways. FIG. 9 graphically illustrates four different exemplary engine control strategies and resulting engine emissions under a fixed set of operating conditions, in accordance with the present disclosure. All tests were conducted in a single engine configuration operating at 1000 RPM and engine load of 3 bar. A first engine control strategy, defined as the baseline data set, includes operation with a standard valving strategy (95/−95 (IMOP/EMOP)), 31% EGR, and an AFR of 22:1. A second engine control strategy, defined as the high valve overlap (HVO) data set, includes operation with a modified valving strategy (95/−80 (IMOP/EMOP)) including a period wherein both an intake valve and an exhaust valve are open, a condition known in the art as internal EGR, and an AFR of 14:1. Exemplary high valve overlap strategies include substantially symmetric intake and exhaust valve opening and closing about a top dead center crank angle. A third engine control strategy, defined as late intake valve close (LIVC)

data set, includes operation with a modified valving strategy (140/−80 (IMOP/EMOP)) including sustaining an intake valve open for a longer duration than in the standard valving strategy and an AFR of 14:1. A fourth engine control strategy, defined as 14:1 w/EGR, includes operation with a standard valving strategy (95/−95 (IMOP/EMOP)), 24% EGR, and an AFR of 14:1. As is apparent in the data, adjustment of the AFR and other operating conditions can elevate molecular hydrogen to high levels in excess of levels available in the baseline data set. Additionally, adjustment of valving strategies and EGR rates include an effect to NOx levels. However, as is apparent in the data sets and in examination of FIGS. 3 and 4, elevated hydrogen production through single injection at lower AFR values includes a limitation on NOx production, and NO levels fail to exist in levels required to support the reaction described in Equation 1.

Engines utilizing direct injection are known to include methods to inject through a direct injection fuel injection system precise amounts of fuel into the combustion chamber at selected timing of the combustion cycle. In another exemplary method to control engine emissions, a split injection can be utilized, wherein a first injection is performed in accordance with stoichiometric or preferably lean operation consistent with elevated production of NOx, and a second injection is performed later in the combustion cycle, preferably after the primary combustion event, wherein fuel is reformed within the combustion chamber, bringing the overall AFR into the stoichiometric or rich range required to produce molecular hydrogen. Further it has been found that the AFR ratio of the first injection tends to control NOx production in the combustion cycle and subsequent reformation of fuel after the NOx is produced, for example through the second injection, tends to control molecular hydrogen production. This exemplary method can be described as late combustion hydrocarbon reformation. In an additional or alternative strategy, a second injection can be utilized in the engine after combustion is substantially complete or injection can be utilized directly into the exhaust gas flow. This post combustion injection can then be reformed on a catalyst to form hydrogen. Similarly to late combustion hydrocarbon reformation, fuel injected after NOx is produced in the early combustion from the first injection and reformed on the catalyst can be utilized to produce molecular hydrogen. This exemplary method can be described as post combustion hydrocarbon reformation. Testing confirms that the AFR resulting from the first injection, in either method, is independent from the overall AFR resulting from the sum of both injections in resulting NOx and hydrogen production. Late or post combustion hydrocarbon reformation can be used as isolated methods, for instance, controlled by timing of the second injection and a status of combustion chamber as defined by the status of the exhaust valve. Additionally, a mixture of the two methods can be utilized, wherein partial reformation of the hydrocarbons can take place in the combustion chamber, and hydrocarbon rich exhaust gas exiting through the exhaust valve can be additionally reformed post combustion on a catalyst. In either strategy, efficiency of hydrogen production for a particular hydrocarbon charge depends greatly upon engine operating conditions, exhaust gas properties, catalyst temperature, and other factors. Through these methods, a calibrated AFR can be utilized in a primary combustion event to control NOx engine-out emissions, and the overall AFR including post-primary combustion injection can be utilized to control hydrogen production. While two injections are described in the above methods, it should be appreciated that a plurality of injections can be used in the early and late or post combustion injections, and the timing of the plurality of injections will control whether the particular injection contributes to NOx production or hydrogen production.

Late combustion hydrocarbon reformation requires a fuel injection into the combustion chamber. Post combustion hydrocarbon reformation can be accomplished through fuel injection into the combustion chamber. Additionally or alternatively, post combustion hydrocarbon reformation can be accomplished through fuel injection directly into the aftertreatment system, for example into the exhaust gas flow between the combustion chamber and the hydrogen forming catalyst or directly onto the hydrogen forming catalyst. In the context of fuel injections directly into the aftertreatment system, the AFR within the combustion chamber is unaffected by the fuel injections into the aftertreatment system, but the overall AFR describing an ability to produce hydrogen on the hydrogen forming catalyst remains a function of the total fuel injected, both into the combustion chamber and directly into the exhaust gas flow.

Reforming of hydrocarbons on a catalyst is exothermic and can generate significant heat. Temperature of the catalyst is preferably monitored or estimated to protect the catalyst from an over-temperature condition. One exemplary method can switch between injection into the combustion cycle and post combustion cycle injection based upon relevant parameters, preferably including catalyst temperature. This catalyst to form hydrogen is upstream of the catalyst utilized to form ammonia, but may exist either as a separate device or as a catalyst within the same unitary aftertreatment device. Additionally, catalyst designs are known to produce hydrogen even in the presence of molecular oxygen, increasing efficiency of hydrogen production by reducing the need to inject extra fuel to deplete oxygen entirely.

Figure 10:
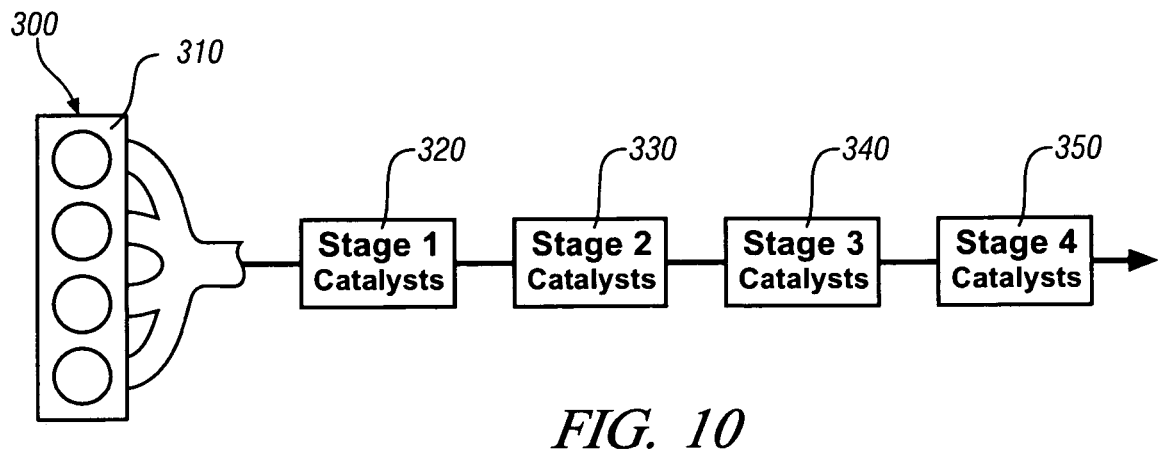
FIG. 10 schematically illustrates an exemplary arrangement of catalysts in an aftertreatment system to accomplish generation of ammonia for use in an SCR device, in accordance with the present disclosure.

FIG. 10 schematically illustrates an exemplary arrangement of catalysts in an aftertreatment system to accomplish generation of ammonia for use in an SCR device, in accordance with the present disclosure. Powertrain 300 includes engine 310, stage 1 catalyst 320, stage 2 catalyst 330, stage 3 catalyst 340, and stage 4 catalyst 350. An exhaust gas flow originates from engine 310 and proceeds through the four catalysts. Powertrain 300, as pictured, is optimized for late combustion hydrocarbon reformation, as described above. Each catalyst facilitates a different reaction according to methods known in the art. In the exemplary configuration of FIG. 10, the stage 1 catalyst 320 is selected to facilitate ammonia generation according to Equation 1, the stage 2 catalyst 330 is selected to facilitate operation according to normal operation of a TWC, the stage 3 catalyst 340 is an SCR device storing and utilizing ammonia to react with NOx, and the stage 4 catalyst 350 is utilized to clean up excess ammonia escaping the SCR device. The stage 1 catalyst can be utilized proximately to the engine, for example, in a device fluidly connected to an exhaust manifold. An exemplary selection of catalysts in the various stages is summarized in Table 1:

TABLE 1

| Catalytic Device | Name | Catalyst Metal (PGM, Cu, Fe) | Washcoat (Zir or Zeo) | Preferred Substrate (metal/ceramic) |
| --- | --- | --- | --- | --- |
| Stage 1 | $NH_3$ Generation | PGM/possibly non-PGM | Alumina-based | Cordierite |
| Stage 2 | TWC | PGM | Alumina with OSC | Cordierite |
| Stage 3 | SCR | Fe or Cu | Zeo | Cordierite |
| Stage 4 | NH3 Cleanup | PGM | Alumina | Cordierite |

In this way, catalysts can be used create and utilize ammonia through late combustion hydrocarbon reformation in an aftertreatment system.

The above catalysts as utilized in FIG. 10 include the stage 1 catalyst for facilitating the reaction described by Equation 1 to generate ammonia. It will be appreciated that in late combustion hydrocarbon reformation, the stage 1 catalyst can additionally include catalyzing material to facilitate reformation of unburnt hydrocarbons exiting the engine and resulting formation of molecular hydrogen. Additionally, such a catalyst can be used to facilitate strictly post combustion hydrocarbon reformation as an alternative hydrogen producing strategy within an aftertreatment system utilizing late combustion hydrocarbon reformation. Such a configuration, operable with either late or post combustion hydrocarbon reformation could result in a catalyst configuration as described by Table 2:

TABLE 2

| Catalytic Device | Name | Catalyst Metal (PGM, Cu, Fe) | Washcoat (Zir or Zeo) | Preferred Substrate (metal/ceramic) |
|---|---|---|---|---|
| Stage 1 | HC Reforming and $NH_3$ Generation | PGM | Alumina-based | Cordierite |
| Stage 2 | TWC | PGM | Alumina with OSC | Cordierite |
| Stage 3 | SCR | Fe or Cu | Zeo | Cordierite |
| Stage 4 | NH3 Cleanup | PGM | Alumina | Cordierite |

Utilized in this way, an aftertreatment system can alternate between or include simultaneous late or post combustion reformation of hydrocarbons in order to create molecular hydrogen in support of the generation of ammonia.

Figure 11:
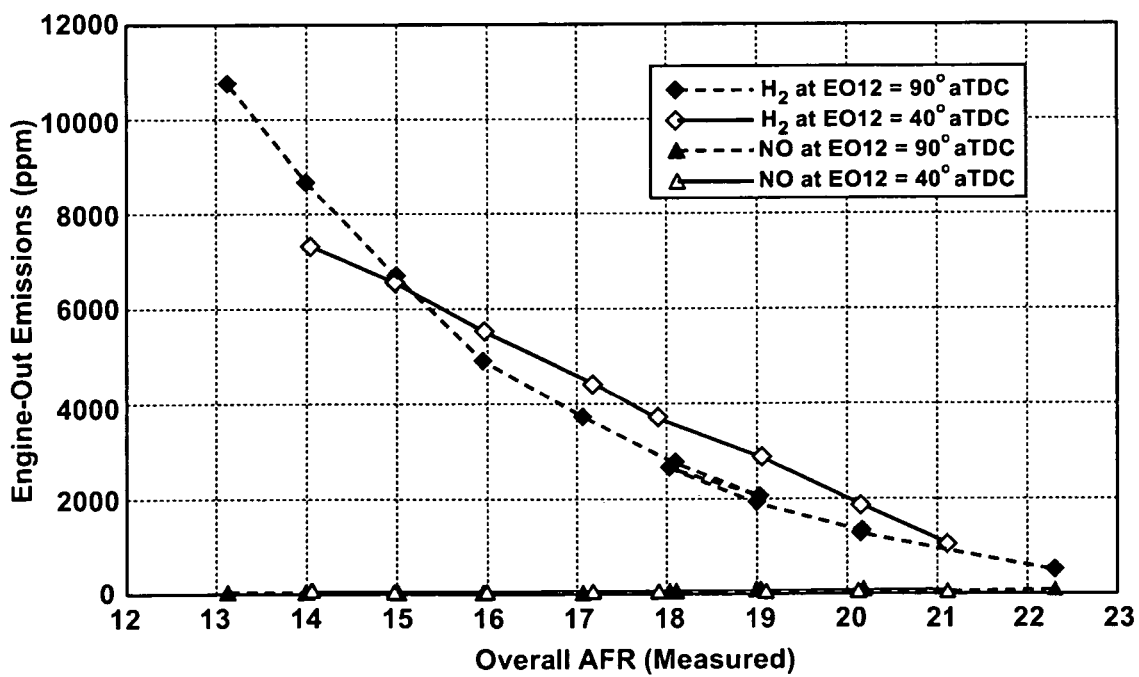
FIG. 11 graphically depicts exemplary test results including production of molecular hydrogen through a second injection, in accordance with the present disclosure.

As discussed above, a second injection can be utilized to produce NOx and hydrogen independently of each other. As described in FIGS. 3 and 4, AFR in single injection combustion simultaneously affects NOx and hydrogen production levels. However, testing has shown that combustion within the combustion chamber according to known methods and timing for the first injection produces NOx substantially in relation to the AFR at the time if the combustion occurring at that time. Referring again to FIGS. 3 and 4 as exemplary conditions that can be present during this combustion, a higher AFR leads to greater NOx production. This NOx, once produced, remains in the exhaust gas flow until it is reacted in the aftertreatment system. FIG. 11 graphically depicts exemplary test results including production of molecular hydrogen through a second injection, in accordance with the present disclosure. A test apparatus according to FIG. 11 was operated at a baseline condition, including a single injection event, 1000 RPM, 3.0 bar, and an AFR of 22:1, with the system resulting in engine emissions comprising approximately 65 ppm NO and approximately 550 ppm molecular hydrogen. The same test apparatus, operated with split injections, wherein the combination of the split injections yield an overall AFR (measured), is depicted in FIG. 11. Test conditions for the split injection test include the baseline conditions, with additional fuel injected to create the measured overall AFR. Two injection timings are depicted, and can be compared with an exemplary opening of an exhaust value at approximately 140° aTDC. The timing of injection, as measured by EOI2, controls how the reformation of the hydrocarbons will occur, for example, by impacting how much of the reformation occurs as late combustion reformation and how much of the reformation occurs as post combustion reformation. In the exemplary data of FIG. 11, the NOx emissions remain largely unaffected from the baseline, while hydrogen emissions change greatly depending upon the overall AFR. As suggested in FIGS. 3 and 4, FIG. 11 depicts a large increase in molecular hydrogen produced as the overall AFR decreases. Depending upon the amount of hydrogen required according to the ammonia being generated and the other reaction components being available, for example NOx and CO according to the exemplary reaction of Equation 1, test results as depicted in FIG. 11 can be utilized as a factor to select a desired overall AFR based upon hydrogen production.

Figure 12:
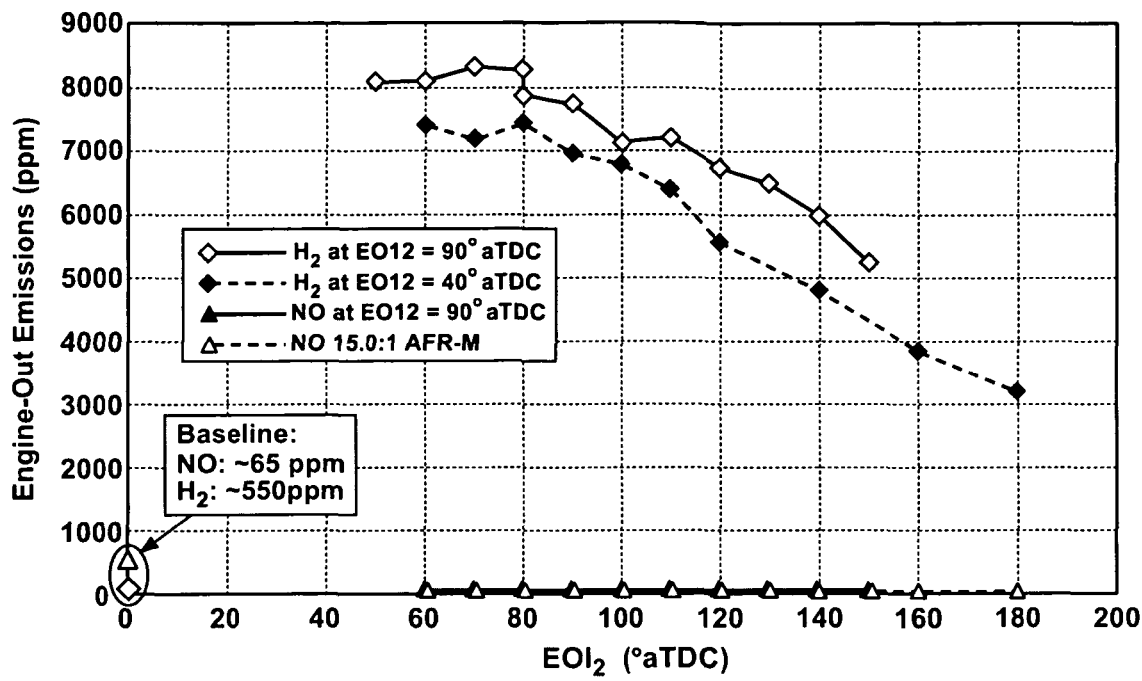
FIGS. 12 and 13 graphically depict exemplary results of varying EOI2 in terms of hydrogen production and hydrogen production per incremental increase in fuel, in accordance with the present disclosure.
Figure 13:
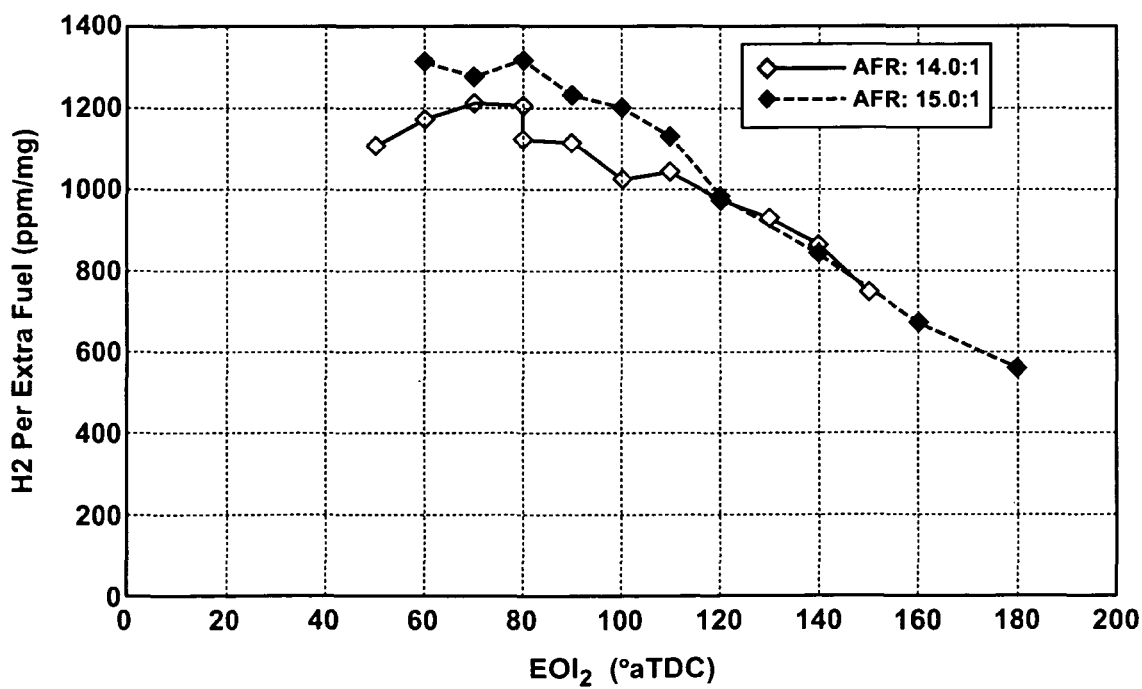

As demonstrated between the data sets of FIG. 11, injection timing of the second injection, expressed as an end of injection (EOI2) value, has an impact on hydrogen production. FIGS. 12 and 13 graphically depicts exemplary results of varying EOI2 in terms of hydrogen production and hydrogen production per incremental increase in fuel, in accordance with the present disclosure. The test results of FIGS. 12 and 13 were generated on the same or similar test apparatus as the test results of FIG. 11. FIG. 12 illustrates hydrogen and NO production at two different measured overall AFR values. As described above, occurrence of late or post combustion hydrocarbon reformation is controlled significantly by timing of the exemplary described second injection and the state of the combustion chamber. An exemplary condition includes an opening of the exhaust valve at some point, for example, 140° aTDC in one engine configuration. Fuel injection occurring at or after the opening of the exhaust valve is likely to pass increasingly out of the engine as HC content in the exhaust gas. The data of FIG. 12, illustrating molecular hydrogen created by in cylinder reformation, reflects decreasing in cylinder reformation as EOI2 retards later in the combustion cycle. Not shown in FIG. 12 is HC content of the exhaust gas flow to be reformed as post combustion hydrocarbon reformation. FIG. 13 illustrates hydrogen production per incremental increase in fuel at two different AFR values. An analysis of test results such as exemplary FIGS. 12 and 13, in combination with other data relating to efficiency of hydrogen production at different operating points, can be utilized as a factor to select timing of the second injection.

Figure 14:
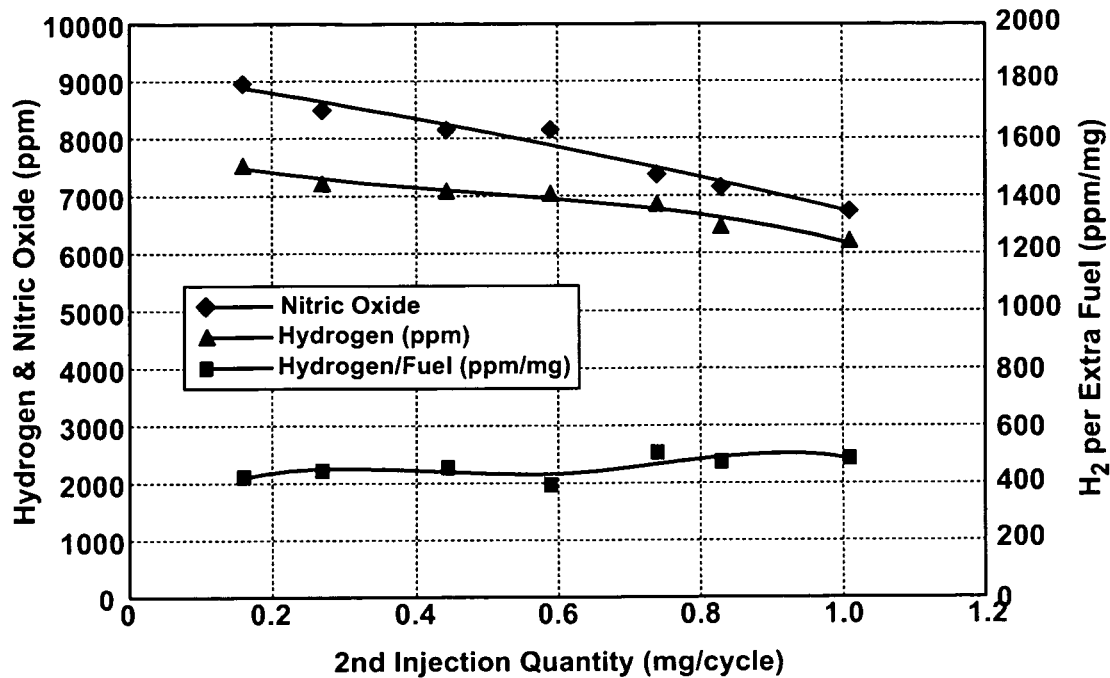
FIG. 14 graphically depicts exemplary results of hydrogen production, NO production, and hydrogen production per incremental increase in fuel for a fixed overall AFR through varying second injection quantity, in accordance with the present disclosure.

As described above, the AFR during the combustion following the first injection event primarily affects NOx production, and the overall AFR as a result of the first and second injection events primarily affects hydrogen production. FIG. 14 graphically depicts exemplary results of hydrogen production, NO production, and hydrogen production per incremental increase in fuel for a fixed overall AFR through varying second injection quantity, in accordance with the present disclosure. The test conditions include a fixed overall AFR of 14:1, a fixed first injection of 9.3 mg/cycle, an end of a first injection (EOI1) value of 210° bTDC, and an EOI2 value of 80° aTDC. Modulation of the second injection quantity through the test includes varying fuel and air quantities through the test sample points so as to maintain the fixed overall AFR. Hydrogen production according the split injection methods, as described above, depends greatly upon the amount of fuel reformed in the absence of oxygen. As is evident in the data of FIG. 14, as more fuel is injected in the second injection event, the resulting AFR in the combustion after the first injection changes corresponding to the additional air that must be injected to maintain the fixed overall AFR, resulting in a small increase in NOx production. Additionally, as more fuel is reformed in the second injection event, hydrogen production and hydrogen production per incremental increase in fuel decrease. An analysis of test results such as exemplary FIG. 14 can be utilized as a factor to select injection quantity of the second injection.

Figure 15:
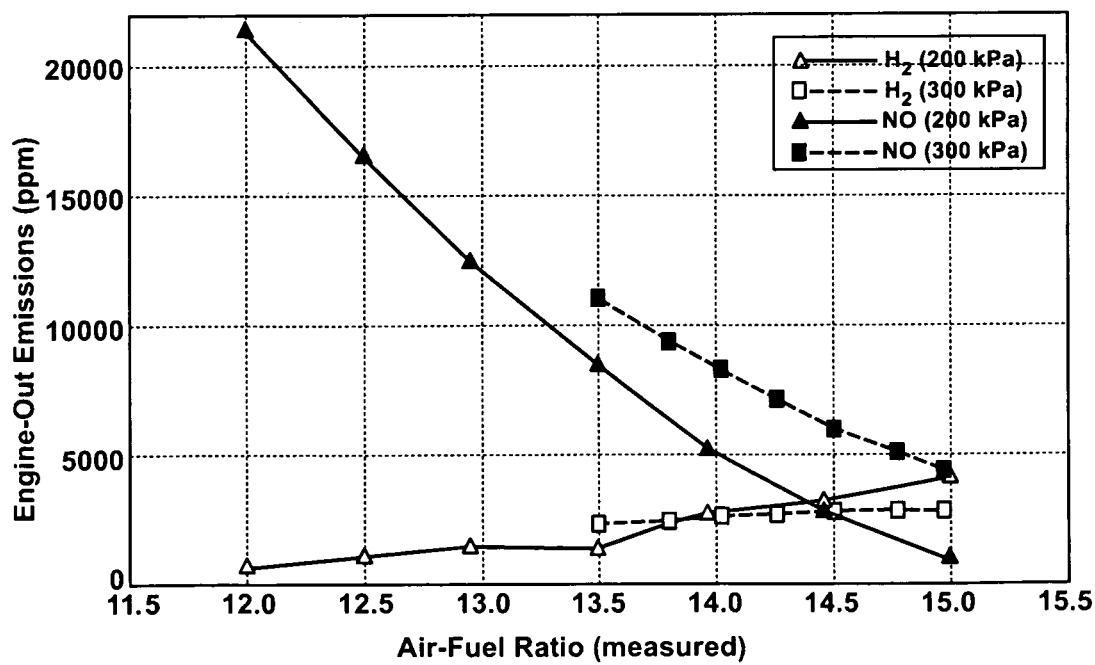
FIGS. 15 and 16 graphically depict exemplary effects of varying AFR in single injection combustion at two engine loads, describing the effects of engine load upon hydrogen production, NOx, production, and hydrogen production per incremental increase in fuel, in accordance with the present disclosure.
Figure 16:
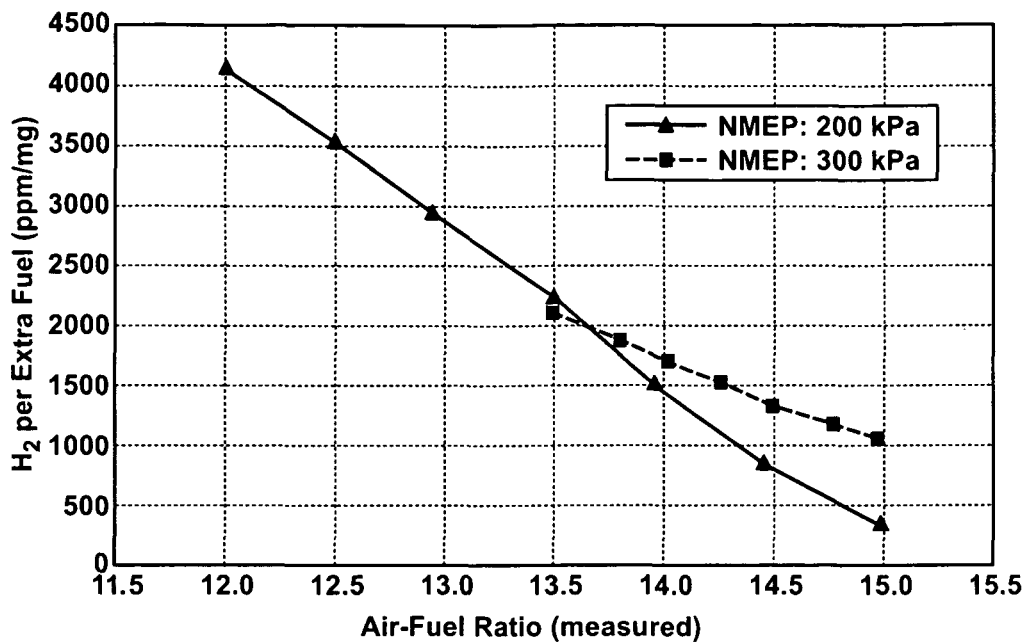

Operation of an engine at light load in powertrains enabled to run under lean conditions or with high AFR values can result in higher AFR values for a single injection combustion cycle. Modifying such operation with a second injection to produce hydrogen at lower AFR values can be prohibitive under such conditions, where the quantity of fuel that would be required to achieve the lower overall AFR would be undesirably high. FIGS. 15 and 16 graphically depict exemplary effects of varying AFR in single injection combustion at two engine loads, describing the effects of engine load upon hydrogen production, NOx, production, and hydrogen production per incremental increase in fuel, in accordance with the present disclosure. The test results of FIGS. 15 and 16 were generated under conditions including 2,000 RPM, spark at a combustion knock limit, and an end of injection (EOI) value of 220° bTDC. As depicted in the exemplary data of FIG. 15, hydrogen and NOx production vary depending upon engine load. FIG. 16 depicts hydrogen production and variation based upon engine load. Similar graphs can be generated for effects of engine load upon hydrogen, NOx production, and hydrogen production per incremental increase of fuel for split injection methods described herein, and analysis of such graphs can be utilized as a factor to estimate effects of engine load upon operation of ammonia generation cycles and operation of split injection events. Additionally, predictive data describing expected operation of the powertrain including external information such as 3D map information, traffic information, driver habits and other details made available from remote systems and on board diagnostic devices such as road sensing, traffic sensing, or other systems can be utilized to predict engine operation and operate ammonia generation cycles at times where engine load is most opportune to efficiently create required components for the reaction to create ammonia. For example, a long uphill slope in a projected course of travel can be utilized as an opportunity to produce ammonia instead of producing ammonia under level or downhill, low load conditions. Additionally, projected engine operation can be utilized to select between late and post combustion hydrocarbon reformation. For example, travel at highway speeds might for a particular powertrain prove to be more efficient in post combustion reformation, whereas stop and go traffic might for the same powertrain be more efficient in late combustion reformation. Such patterns could be identified an preprogrammed in a control module, or alternatively or additionally, operation of a particular powertrain could be adaptively developed over time through use of neural networks, machine learning algorithms, or other adaptive techniques known in the art.

Figure 17:
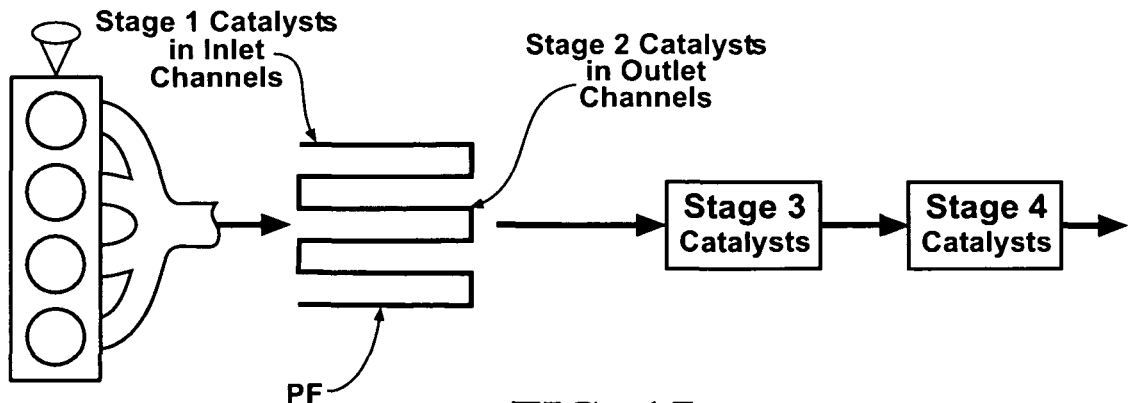
FIGS. 17-21 schematically illustrate different exemplary embodiments in which catalysts described herein can be arranged in an aftertreatment system, in accordance with the present disclosure.
Figure 18:
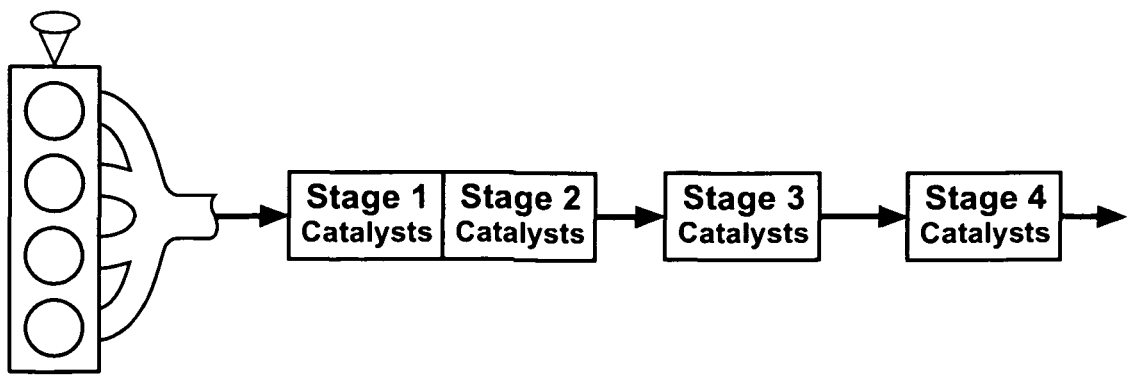
Figure 19:
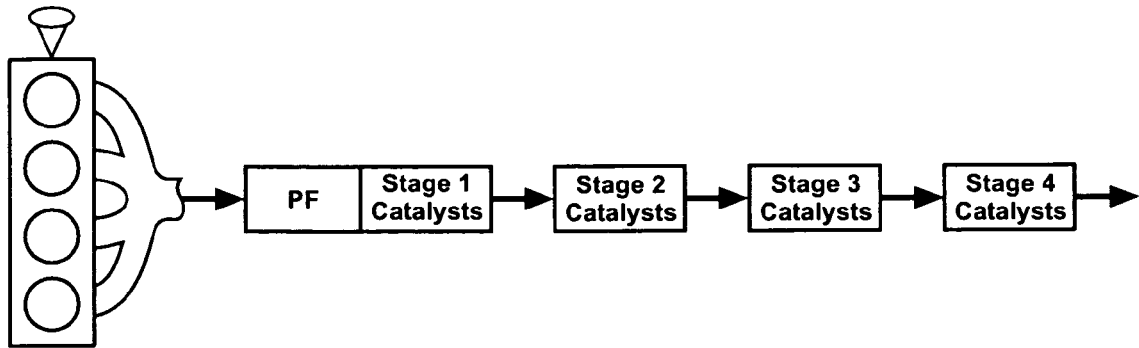
Figure 20:
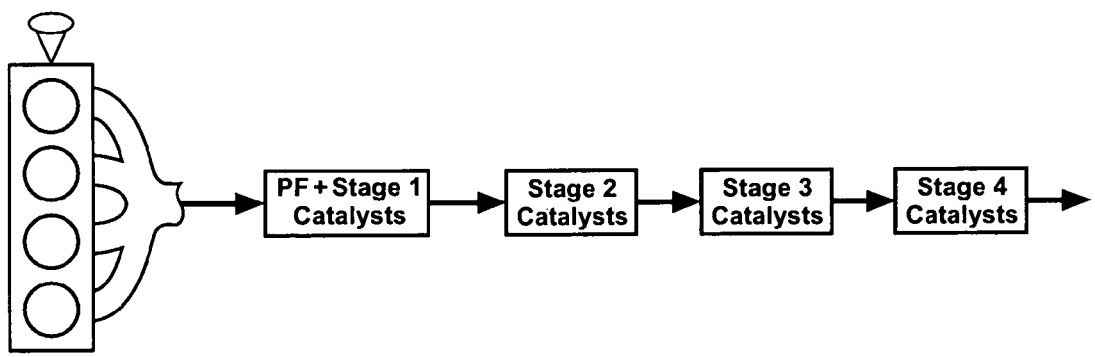
Figure 21:
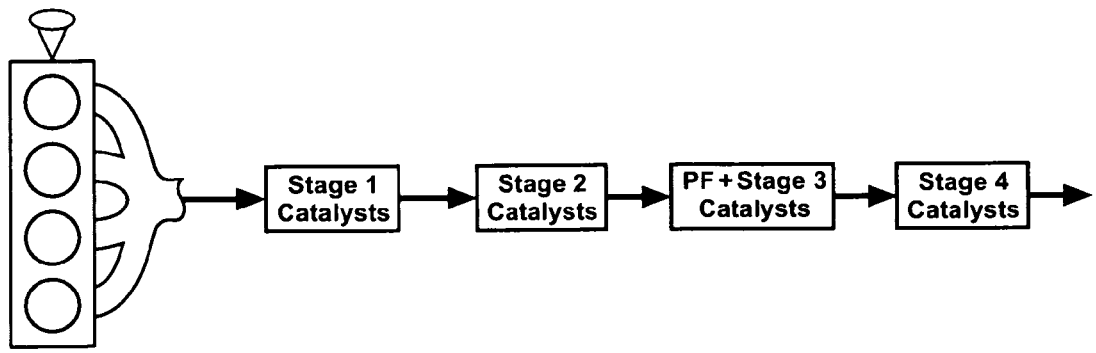

It should be noted that while the exemplary configuration of FIG. 10 depicts the various stages as separate catalysts, the different catalysts can be grouped together variously in a single device. FIGS. 17-21 schematically illustrate different exemplary embodiments in which catalysts described herein can be arranged in an aftertreatment system, in accordance with the present disclosure. FIG. 17 depicts an arrangement of 4 stages of catalysts, including a particulate filter device with stage 1 and stage 2 catalysts coated on inlet and exit channels of the filter, respectively. FIG. 18 depicts an arrangement of 4 stages of catalysts, with stage 1 and stage 2 catalysts coated on a single element within a single device. FIG. 19 depicts an arrangement of 4 stages of catalysts, wherein stage 1 catalysts are arranged immediately after and within a single device with a particulate filter. FIG. 20 depicts an arrangement similar to FIG. 19, except that the stage 1 catalyst is located within the particulate filter, for example, as a surface coating within the device. FIG. 21 depicts and arrangement of 4 stages of catalysts, wherein a stage 3 catalyst, performing a role of an SCR, is located within a particulate filter. In addition to the illustrated embodiments, devices utilizing a stage 3 catalyst can typically include unitarily a stage 4 catalyst in order to clean up slipped ammonia. Exemplary embodiments depicted within FIGS. 17-21 are disclosed for purposes of illustrating possible arrangements in which stage 1 through stage 4 catalysts might be utilized. However, it will be appreciated by one having ordinary skill in the art that these embodiments are not the only arrangements in which these catalysts can be utilized, and this disclosure is not intended to be limited to the particular embodiments described herein.

Further, it will be appreciated that aftertreatment systems can come in many configurations known in the art, and the chemical reaction utilized to create ammonia can take a number of forms requiring different catalysts and different operating conditions. For example different devices are utilized in the exhaust gas flow of a gasoline engine, for example a TWC device, and a diesel engine, for example, a DOC device. The exemplary configuration of FIG. 10 is one way that the creation of ammonia can be accomplished within an aftertreatment system, however, this disclosure is not intended to be limited to the specific embodiments described herein. Additionally, other reactions are known that can be utilized to produce ammonia. For example, another reaction that can be utilized includes the following.

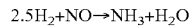

$$2.5H_2+NO \rightarrow NH_3+H_2O \quad [2]$$

This reaction has the advantage of being independent from the presence of CO but requires molecular hydrogen in higher quantities. Another exemplary reaction that can be utilized to produce ammonia includes the following.

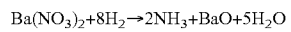

$$Ba(NO_3)_2+8H_2 \rightarrow 2NH_3+BaO+5H_2O \quad [3]$$

Utilization of this reaction requires a device that includes barium. As will be appreciated by one having ordinary skill in the art, barium is not known to be present in devices utilizing a PGM catalyst, such as a TWC, a DOC, or certain LNT devices, but is known to be used in most LNT devices where barium is used for storing the NOx during lean operation. It will additionally be appreciated that each of these reactions can require different catalysts and powertrain operating conditions for normal operation. Additionally, the different NO and molecular hydrogen ratios of each reaction will change the AFR required to efficiently operate an ammonia generation cycle.

Catalyst design includes methods and preferences known in the art. Exemplary catalysts utilized in the TWC design utilized to produce ammonia as a result of a reaction described in Equation 1, as described above in association with Table 1, preferably include a platinum and palladium based catalyst (PGM catalyst), but the method can be utilized with certain non-PGM catalysts capable of producing the required reaction. The catalyst can be incorporated in a close coupled or pup catalyst device, located proximately to the exhaust manifold of the engine, or can be utilized in a detached device.

Ammonia generation cycles can be utilized as needed to provide ammonia to the SCR device. One method includes periodic ammonia generation cycles. In the alternative, $\theta_{NH_3}$ can be estimated by methods described above and utilized to schedule ammonia generation cycles as needed. Ammonia generation cycles, utilizing stoichiometric or rich operation of the engine, can be scheduled to utilize periods wherein such operation is already required according to powertrain output requirements. Lean operation of an engine, particularly lean operation taking advantage of combustion methods such as homogeneous charge compression ignition or stratified charge modes, typically occurs in lower load and lower engine speeds. For example, lean operation is frequently utilized in instances of highway travel, wherein the engine is utilized in stable operation to sustain speeds. Rich operation is utilized wherein lean operation is not possible or preferable. For example, rich operation is frequently utilized in instances of acceleration, wherein generating force required to accelerate a vehicle requires high engine loads, and traversing transmission operating range states requires engine speeds including high engine speeds. Monitoring engine usage can enable initiation of an ammonia generation cycle in response to a switch to a rich operation mode. In addition or in the alternative, prediction of engine usage can be made statistically or in coordination with a 3D map device, predictively initiating ammonia production based upon anticipated engine usage that will already require high engine speeds or loads.

Ammonia produced by the above methods can be stored on a catalyst within an SCR device selected with a capacity to store ammonia. As is known in the art, storage of ammonia on a catalyst depends upon a number of properties of the exhaust flow, for example $T_{BED}$ and SV. Elevated catalyst bed temperatures or elevated velocities of the exhaust gas flow within the SCR device cause slippage. Ammonia generation cycles can be predictively scheduled based upon predicted $T_{BED}$ and SV ranges conducive to retaining stored ammonia. $T_{BED}$ can be measured or predicted according to a model. An exemplary expression of $T_{BED}$ can be given by the following functional relationship.

$$T_{BED} = f(T_1, T_2, M_{DOT\_EXH}, T_{AMB}, \text{SCR Geometry}) \quad [4]$$

$T_1$ describes temperature of the exhaust gas flow measured upstream of the SCR device, and $T_2$ describes temperature of the exhaust gas flow measured downstream of the SCR device. $M_{DOT\_EXH}$ describes a mass flow rate of exhaust gas through the SCR device and can be estimated or modeled based upon operation of the engine. $T_{AMB}$ describes a temperature of ambient conditions to the exhaust system and can be directly measured or determined based upon commonly measured values such as intake air temperature. SV can similarly be predicted according to $M_{DOT\_EXH}$ and SCR geometry. In this way, ammonia production can be accomplished at times wherein excessive slippage will not foreseeably deplete the ammonia from the SCR device.

Engine speeds and loads are important to ammonia generation cycles. Additionally, engine operation can create high temperature and high mass flow rates in the exhaust gas flow. Resulting conditions in the exhaust gas flow from operation of the engine can result in operating conditions requiring wasteful injection of extra fuel or conditions creating excess slip in the SCR causing depletion of ammonia. However, hybrid powertrains including an engine and other torque generative devices can deliver a required output torque to a drivetrain while modulating the balance between the various devices of the powertrain. Other torque generative devices can include an electric machine or machines capable of operating in a torque generating motor mode or an energy recovery generator mode. Such electric machines are operatively connected to an energy storage device capable of delivering to or receiving and storing electric energy from the electric machines. In this way, engine operation may be decoupled from the required output torque to increase efficiency of ammonia production and storage in an aftertreatment system. For example, engine torque can be allowed to exceed the required output torque, utilizing stoichiometric or rich engine operation conducive to ammonia production at high load, and engine torque exceeding the required output torque can be recovered through an electric machine to the energy storage device. In this way, extra fuel utilized to generate hydrogen can create stored energy instead of being entirely rejected as heat in the aftertreatment system. In another example, under high load operation, for example in a vehicle towing a heavy object up a sustained slop under wide-open-throttle conditions, exhaust temperatures resulting from operation of the engine at high load can create excessive slippage in the SCR device. An electric machine or machines can be utilized to provide some of the required output torque, thereby reducing the load required of the engine, allowing operation of the engine at a gear state allowing lower engine speed, and reducing resulting temperatures in the exhaust gas. In this way, a hybrid powertrain can be utilized to facilitate ammonia production and storage.

The methods described herein contemplate production of ammonia through ammonia generation cycles, utilizing components of the exhaust gas flow to sustain aftertreatment of NOx in an SCR device. It will be appreciated that these methods can be used in isolation from urea injection, with the methods described supplying all of the required ammonia. In the alternative, the methods described herein can be used to compliment a urea injection system, extending the range of the system between required filling of a urea storage tank while allowing a full range of engine and powertrain operation without significant monitoring of ammonia generation cycles and current storage capacity, due to available urea injection on demand.

Figure 22:
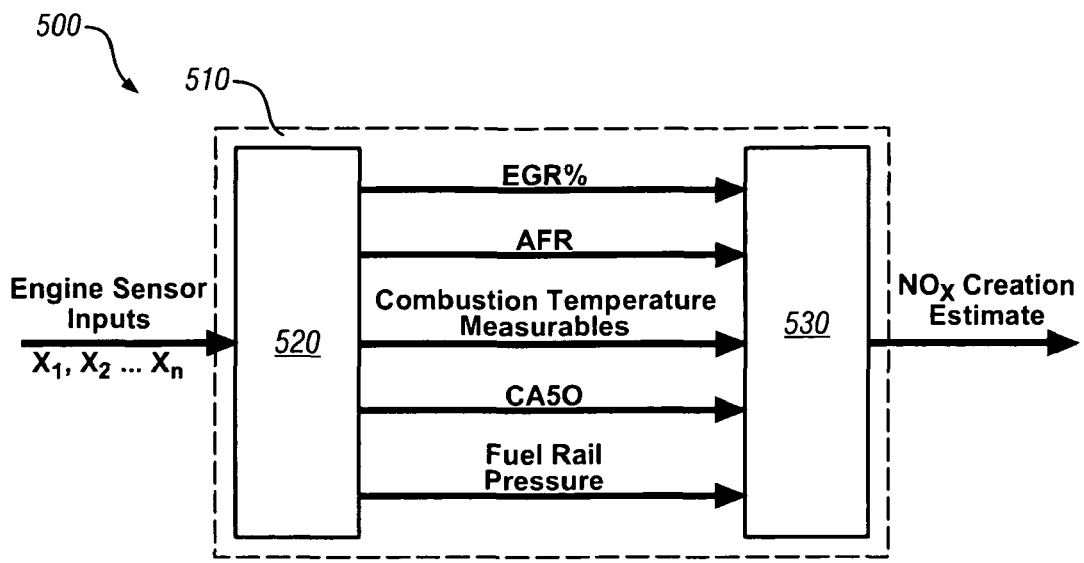
FIG. 22 schematically depicts an exemplary NOx model module, utilized within an engine control module and determining a NOx creation estimate, in accordance with the present disclosure.

A NOx sensor or an oxygen sensor add cost and weight to a vehicle, and such sensors frequently require a particular operating temperature range, achieved after some warm-up time, to be functional. As described above a virtual NOx sensor can be used to estimate the presence of NOx in an aftertreatment system. FIG. 22 schematically depicts an exemplary NOx model module, utilized within an engine control module and determining a NOx creation estimate, in accordance with the present disclosure. Exemplary NOx model module 500 is operated within NOx creation estimating system 510 and comprises a model module 520 and a NOx estimation module 530. Engine sensor inputs $x_1$ through $x_n$ are inputs to the NOx model module and can include a number of factors, including temperatures, pressures, engine control settings including valve and spark timings, and other readings indicative of combustion state within the combustion chamber. Model module 520 receives these inputs and applies known relationships to determine a number of parameters to describe combustion within the combustion chamber. Examples of these descriptive parameters include EGR %, the percentage of exhaust gas diverted back into the combustion chamber in order to control the control the combustion process; an air-fuel charge ratio (AFR) describing the mixture of air and fuel present in the combustion chamber; combustion temperature measurables, including, for example, either combustion burned gas temperature or average combustion temperature; a combustion timing measurable tracking the progress of combustion through a combustion process, for example CA50, a measurement of at what crank angle 50% of the mass of fuel originally present in the combustion chamber is combusted; and fuel rail pressure, indicating the pressure of fuel available to fuel injectors to be sprayed into the combustion chamber. These descriptive parameters can be used to estimate conditions present within the combustion chamber through the combustion process. As described above, conditions present within the combustion chamber affect the creation of NOx in the combustion process. These descriptive parameters can be fed to NOx estimation module 530, wherein programmed calculations utilize the descriptive parameters as inputs to generate an estimate of NOx creation due to the combustion process. However, as described above, models analyzing variable descriptive of the combustion process can include complex calculations which can take longer to calculate than required for generating real-time results, require large amounts of processing capability, and are only as accurate as the pre-programmed algorithm permits. As a result of these challenges and a need for accurate and timely information, estimation of NOx creation within an ECM as part of an aftertreatment control strategy is not preferable.

Monitoring NOx through a virtual NOx sensor can require monitoring of the combustion process to accurately estimate NOx production from the engine. Additionally, accurate control of multiple injections, as described in the method above, can be aided by monitoring the combustion process. A variety of engine sensor inputs can be used to quantify parameters descriptive of the combustion process. However, combustion occurring within the engine is difficult to directly monitor. Sensors may detect and measure fuel flow and air flow into the cylinder, a sensor may monitor a particular voltage being applied to a spark plug or a processor may gather a sum of information that would predict conditions necessary to generate an auto-ignition, but these readings together are merely predictive of combustion and do not measure actual combustion results. One exemplary method measuring actual combustion results utilizes pressure measurements taken from within the combustion chamber through a combustion process. Cylinder pressure readings provide tangible readings describing conditions within the combustion chamber. Based upon an understanding of the combustion process, cylinder pressures may be analyzed to estimate the state of the combustion process within a particular cylinder, describing the combustion in terms of both combustion phasing and combustion strength. Combustion of a known charge at known timing under known conditions produces a predictable pressure within the cylinder. By describing the phase and the strength of the combustion at certain crank angles, the initiation and the progression of a particular combustion process may be described as an estimated state of combustion. By estimating the state of the combustion process for a cylinder, factors affecting NOx creation through the combustion process can be determined and made available for use in NOx creation estimation.

Figure 23:
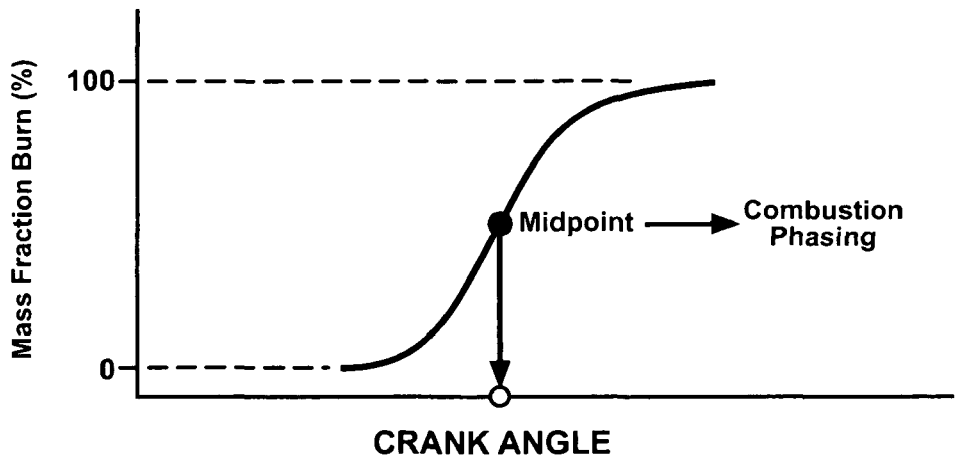
FIG. 23 graphically illustrates an exemplary mass fraction burn curve in accordance with the present disclosure.

One known method for monitoring combustion phasing is to estimate the mass fraction burn ratio for a given crank angle based upon known parameters. The mass fraction burn ratio describes what percentage of the charge in the combustion chamber has been combusted and serves as a good estimate of combustion phasing. FIG. 23 graphically illustrates an exemplary mass fraction burn curve in accordance with the present disclosure. For a given crank angle, the curve depicted describes the estimated percentage of fuel air mixture within the charge that has been combusted for that combustion process. In order to be used as a metric of combustion phasing, it is known to identify either a particular mass fraction burn percentage of interest or a particular crank angle of interest. FIG. 23 identifies CA50% as a crank angle at which the mass fraction burn equals 50%. By examining this particular metric across a plurality of combustion processes in this cylinder or across a number of cylinders, the comparative phasing of the particular combustion processes may be described.

As described above, combustion phasing can be utilized to estimate the state of a particular combustion process. An exemplary method for monitoring combustion phasing to diagnose ineffective combustion is disclosed whereby combustion in an engine is monitored, mass fraction burn ratios are generated for each cylinder combustion process, and the combustion phasing across the cylinders are compared. If the combustion phase for one cylinder at a particular crank angle for that first cylinder differs by more than a threshold phase difference from the combustion phase for another cylinder at the same crank angle for that second cylinder, anomalous combustion can be inferred. Many sources of anomalous combustion may be diagnosed by this method. For example, if some condition causes early ignition or knocking within the combustion chamber, the cylinder pressure readings will exhibit different values than normal combustion. Additionally, fuel system injection timing faults, causing injection of the charge at incorrect timing, will cause anomalous cylinder pressure readings. Further, if a cylinder misfires or never achieves combustion, the cylinder pressure readings will exhibit different values than normal combustion. Similarly, pressure curves may be used to diagnose other abnormal combustion conditions, such as changes in the air fuel mixture, changes in camshaft phasing, and maintenance failures to related components. Any such diagnoses of combustion health have implications to NOx and can be useful to estimate NOx creation.

Many methods are known to estimate mass fraction burn. One method examines pressure data from within the combustion chamber, including analyzing the pressure rise within the chamber attributable to combustion. Various methods exist to quantify pressure rise in a cylinder attributable to combustion. Pressure ratio management (PRM) is a method based upon the Rassweiler approach, which states that mass fraction burn may be approximated by the fractional pressure rise due to combustion. Combustion of a known charge at a known time under known conditions tends to produce a consistently predictable pressure rise within the cylinder. PRM derives a pressure ratio (PR) from the ratio of a measured cylinder pressure under combustion at a given crank angle ($P_{CYL}(\theta)$) to a calculated motored pressure, estimating a pressure value if no combustion took place in the cylinder, at a given crank angle ($P_{MOT}(\theta)$), resulting in the following equation.

$$PR(\theta) = \frac{P_{CYL}(\theta)}{P_{MOT}(\theta)} \quad [5]$$

Figure 24:
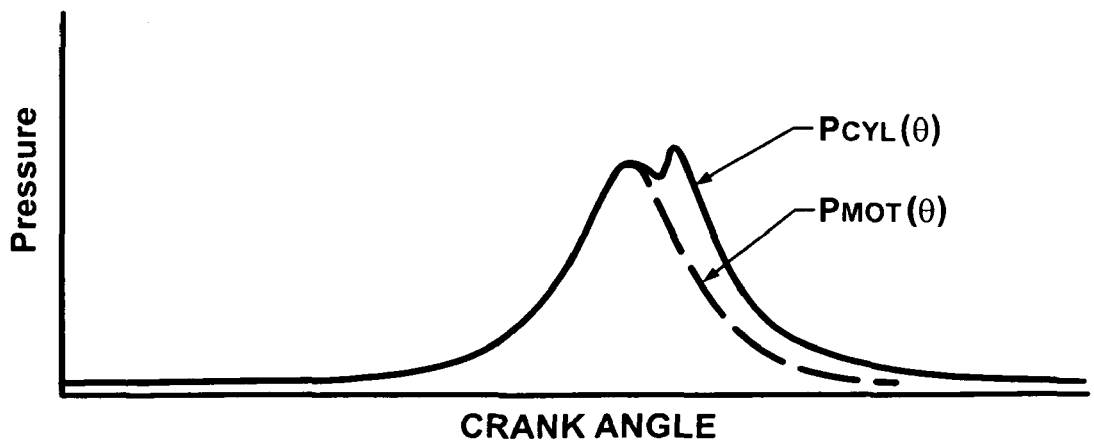
FIG. 24 graphically illustrates an exemplary cylinder pressure plotted against crank angle through a combustion process, in accordance with the present disclosure.

FIG. 24 graphically illustrates an exemplary cylinder pressure plotted against crank angle through a combustion process, in accordance with the present disclosure. $P_{MOT}(\theta)$ exhibits a smooth, inverse parabolic peak from the piston compressing a trapped pocket of gas without any combustion. All valves are closed with the piston at BDC, the piston rises compressing the gas, the piston reaches TDC at the peak of the pressure curve, and the pressure reduces as the piston falls away from TDC. A rise in pressure above $P_{MOT}(\theta)$ is depicted by $P_{CYL}(\theta)$. The timing of combustion will vary from application to application. In this particular exemplary curve, $P_{CYL}(\theta)$ begins to rise from $P_{MOT}(\theta)$ around TDC, describing an ignition event sometime before TDC. As the charge combusts, heat and work result from the combustion, resulting in an increase in pressure within the combustion chamber. PR is a ratio of $P_{MOT}$ to $P_{CYL}$, and $P_{MOT}$ is a component of $P_{CYL}$. Net combustion pressure (NCP($\theta$)) is the difference between $P_{CYL}(\theta)$ and $P_{MOT}(\theta)$ or the pressure rise in the combustion chamber attributable to combustion at a given crank angle. It will be appreciated that by subtracting one from PR, a ratio of NCP to $P_{MOT}$ may be determined.

$$PR(\theta) - 1 = \frac{P_{CYL}(\theta)}{P_{MOT}(\theta)} - \frac{P_{MOT}(\theta)}{P_{MOT}(\theta)} = \frac{NCP(\theta)}{P_{MOT}(\theta)} \qquad [6]$$

PR measured through the equation above therefore may be used to directly describe the strength of combustion within a cylinder. Normalizing PR minus one at crank angle θ to an expected or theoretical maximum PR value minus one yields a fractional pressure ratio of the pressure rise due to combustion at crank angle θ to the expected total pressure rise due to combustion at the completion of the combustion process. This normalization can be expressed by the following equation.

$$FPR(\theta) = \frac{PR(\theta) - 1}{PR(90°) - 1} \propto MassFractionBurn(\theta) \qquad [7]$$

This fractional pressure ratio, by equating pressure rise attributable to combustion to the progression of combustion, describes the mass fraction burn for that particular combustion process. By utilizing PRM, pressure readings from a cylinder may be used to estimate mass fraction burn for that cylinder.

The above method utilizing PRM is applicable for broad ranges of temperature, cylinder charge and timings associated with compression ignition engines, with the added benefit of not requiring calibrated pressure sensors. Because PR is a ratio of pressures, a non-calibrated linear pressure transducer may be utilized to acquire pressure data readings from each cylinder.

Another method to estimate mass fraction burn is to directly utilize the Rassweiler approach to determine mass fraction burn by calculating the total heat released for a given crank angle. The Rassweiler approach utilizes pressure readings from a cylinder to approximate the incremental heat release in the cylinder. This approach is given by the following equation.

$$Q_{Released}(\theta) = \sum P_{k+1} - P_{k-1}\left(\frac{V_{k-1}}{V_k}\right)^r \qquad [8]$$

Mass fraction burn, a measure of how much of the charge has been combusted by a certain crank angle, may be approximated by determining what fraction of heat release for a combustion process has taken place at a given crank angle. The incremental heat release determined by the Rassweiler approach may be summed over a range of crank angles, compared to the total expected or theoretical heat release for the combustion process, and utilized to estimate mass fraction burn. For example, if 75% of the total expected heat release has been realized for a given crank angle, we can estimate that 75% of the combustion for the cycle has taken place at that crank angle.

Other methods may be used to estimate mass fraction burn. One method quantifies the rate of change of energy within the combustion chamber due to combustion through an analysis of classical heat release measures based on analysis of the heat released and work performed through the combustion of the charge. Such analyses are focused on the First Law of Thermodynamics, which states that the net change on energy in a close system is equal to the sum of the heat and work added to the system. Applied to a combustion chamber, the energy increase in the combustion chamber and the enclosed gases equals the heat transferred to the walls of the chamber and the gases plus the expansive work performed by the combustion.

An exemplary method utilizing these classic heat release measures to approximate a mass fraction burn estimate analyzes the rate of heat release by charge combustion throughout combustion process. This rate of heat release, $dQ_{ch}/d\theta$, may be integrated over a range of crank angles in order to describe the net energy released in the form of heat. Through derivations well known in the art, this heat release may be expressed through the following equation.

$$Q = \int \frac{dQ_{ch}}{d\theta} = \int \left(\frac{\gamma}{\gamma-1} p \frac{dV}{d\theta} + \frac{1}{\gamma-1} V \frac{dp}{d\theta}\right) \qquad [9]$$

Gamma, γ, comprises a ratio of specific heats and is nominally chosen as that for air at the temperature corresponding to those used for computing the signal bias and without EGR. Thus, nominally or initially γ=1.365 for diesel engines and nominally γ=1.30 for conventional gasoline engines. These can however be adjusted based on the data from the specific heats for air and stoichiometric products using an estimate of the equivalence ratio, φ, and EGR molar fraction targeted for the operating condition and using the relation that [γ=1+(R/$c_v$)], wherein R is the universal gas constant, and the weighted average of air and product properties through the following expression.

$$c_v(T) = (1.0 - \phi \ast EGR) \ast c_{vair}(T) + (\phi \ast EGR) \ast c_{vstoichprod}(T) \qquad [10]$$

With the expression evaluated at the gas temperature corresponding to that for pressures sampled for the computation of signal bias.

Whether calculated through the preceding method or by some other method known in the art, the calculation of energy released within the combustion process for a given crank angle may be compared to an expected or theoretical total energy release for the combustion process. This comparison yields an estimate of mass fraction burn for use in describing combustion phasing.

The methods described hereinabove are readily reduced to be programmed into a microcontroller or other device for execution during ongoing operation of an internal combustion engine, as follows.

Once a mass fraction burn curve is generated for a particular combustion process, the curve is useful to evaluate the combustion phasing for that particular combustion process. Referring again to FIG. 23, a reference point is taken from which to compare mass fraction burn estimates from different combustion processes. In this particular embodiment, CA50%, representing the crank angle at which 50% of the charge is combusted, is selected. Other measures can be selected so long as the same measure is used for every comparison.

Determination of mass fraction burn values is a practice well known in the art. Although exemplary methods are described above for determining mass fraction burn, the methods disclosed herein to utilize mass fraction burn values to diagnose cylinder combustion issues may be used with any method to determine mass fraction burn. Any practice for developing mass fraction burn may be utilized, and this disclosure is not intended to be limited to the specific methods described herein.

Additional methods exist to analyze cylinder pressure signals. Methods are known for processing complex or noisy signals and reducing them to useful information. One such method includes spectrum analysis through Fast Fourier Transforms (FFT). FFTs reduce a periodic or repeating signal into a sum of harmonic signals useful to transform the signal into the components of its frequency spectrum. Once the components of the signal have been identified, they may be analyzed and information may be taken from the signal.

Pressure readings from the pressure transducers located in or in communication with the combustion cylinders contain information directly related to the combustion occurring within the combustion chamber. However, engines are very complex mechanisms, and these pressure readings can contain, in addition to a measure of $P_{CYL}(\theta)$, a multitude of pressure oscillations from other sources. Fast Fourier Transforms (FFTs) are mathematical methods well known in the art. One FFT method known as spectrum analysis analyzes a complex signal and separates the signal into its component parts which may be represented as a sum of harmonics. Spectrum analysis of a pressure transducer signal represented by $f(\theta)$ may be represented as follows.

$$FFT(f(\theta)) = A_0 + (A_1 \sin(\omega_0\theta+\phi_1)) + (A_2 \sin(2\omega_0\theta+\phi_2)) + \ldots + (A_N \sin(N\omega_0\theta+\phi_N)) \quad [11]$$

Each component N of the signal $f(\theta)$ represents a periodic input on the pressure within the combustion chamber, each increasing increment of N including signals or higher frequency. Experimental analysis has shown that the pressure oscillation caused by combustion and the piston moving through the various stages of the combustion process, $P_{CYL}(\theta)$, tends to be the first, lowest frequency harmonic. By isolating this first harmonic signal, $P_{CYL}(\theta)$ can be measured and evaluated. As is well known in the art, FFTs provide information regarding the magnitude and phase of each identified harmonic, captured as the $\phi$ term in each harmonic of the above equation. The angle of first harmonic, or $\phi_1$, is, therefore, the dominant term tracking combustion phasing information. By analyzing the component of the FFT output related to $P_{CYL}$, the phasing information of this component can be quantified and compared to either expected phasing or the phasing of other cylinders. This comparison allows for the measured phasing values to be evaluated and a warning indicated if the difference is greater than a threshold phasing difference, indicating combustion issues in that cylinder.

Signals analyzed through FFTs are most efficiently estimated when the input signal is at steady state. Transient effects of a changing input signal can create errors in the estimations performed. While methods are known to compensate for the effects of transient input signals, the methods disclosed herein are best performed at either idle or steady, average engine speed conditions in which the effects of transients are eliminated. One known method to accomplish the test in an acceptably steady test period is to take samples and utilize an algorithm within the control module to either validate or disqualify the test data as being taken during a steady period of engine operation.

It should be noted that although the test data is preferably taken at idle or steady engine operation, information derived from these analyses can be utilized by complex programmed calculations or engine models to effect more accurate engine control throughout various ranges of engine operation. For example, if testing and analysis at idle shows that cylinder number four has a partially clogged injector, fuel injection timing could be modified for this cylinder throughout different ranges of operation to compensate for the perceived issue.

Once cylinder pressure signals have been analyzed through FFTs, information from the pressure signal can be used in variety of ways to analyze the combustion process. For example, the analyzed pressure signal can be used to generate a fractional pressure ratio as discussed in methods above and used to describe the mass fraction burn percentage to describe the progress of the combustion process.

Once a measure such as pressure readings are available, other descriptive parameters relating to a combustion process can be calculated. Sub-models describing particular characteristics of a combustion process can be employed utilizing physical characteristics and relationships well known in the art to translate cylinder pressures and other readily available engine sensor terms into variable descriptive of the combustion process. For example, volumetric efficiency, a ratio of air-fuel charge entering the cylinder as compared to the capacity of the cylinder, can be expressed through the following equation.

$$\eta_{VE} = f(RPM, P_{im}, \dot{m}_a) \quad [12]$$

RPM, or engine speed, is easily measurable through a crankshaft speed sensor, as describe above. $P_{im}$, or intake manifold pressure, is typically measured as related to engine control, and is a readily available term. $\dot{m}_a$, or the fresh mass air flow portion of the charge flowing into the cylinder, is also a term frequently measured in the air intake system of the engine or can alternatively be easily derived from $P_{im}$, ambient barometric pressure, and known characteristics of the air intake system. Another variable descriptive of the combustion process that can be derived from cylinder pressures and other readily available sensor readings is charge flow into the cylinder, $\dot{m}_c$. $\dot{m}_c$ can be determined by the following equation.

$$\dot{m}_c = \frac{P_{im} \cdot rpm \cdot D \cdot \eta}{2RT_{im}} \quad [13]$$

D equals the displacement of the engine. R is a gas constant well known in the art. $T_{im}$ is a temperature reading from the inlet manifold. Another variable descriptive of the combustion process that can be derived from cylinder pressures and other readily available sensor readings is EGR %, or the percentage of exhaust gas being diverted into the exhaust gas recirculation circuit. EGR % can be determined by the following equation.

$$EGR\% = 1 - \frac{\dot{m}_a}{\dot{m}_c} \quad [14]$$

Yet another variable descriptive of the combustion process that can be derived from cylinder pressures and other readily available sensor readings is CAx, wherein x equals a desired fractional pressure ratio. CAx can be determined by the following equation.

$$Z = \frac{P_{CYL}(\theta)}{P_{MOT}(\theta)} - 1 \quad [15]$$

Filling in the desired fractional pressure ratio as Z and solving for $\theta$ yields CAx. For instance CA50 can be determined as follows.

$$\frac{P_{CYL}(\theta)}{P_{MOT}(\theta)} = 1.5 \quad [16]$$

Figure 25:
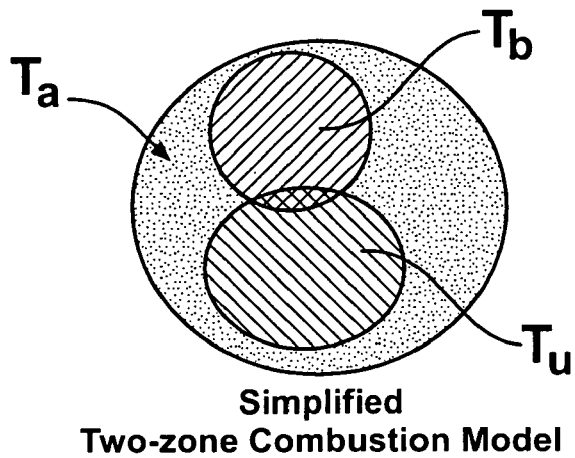
FIG. 25 depicts a number of different temperatures capable of estimation within the combustion chamber important to describing the combustion process, in accordance with the present disclosure.

Various temperatures within the combustion chamber can also be estimated from cylinder pressures and other readily available sensor readings. FIG. 25 depicts a number of different temperatures capable of estimation within the combustion chamber important to describing the combustion process, in accordance with the present disclosure. $T_a$, the average temperature within the combustion chamber can be determined by the following equation.

$$T_a = \frac{P_{max} \cdot V(PPL)}{1.05 * \dot{m}_c R} \qquad [17]$$

$P_{max}$ is the maximum pressure achieved within the combustion chamber through the combustion process. PPL is a measure of the crank angle at which $P_{max}$ occurs. V(PPL) is the volume of the cylinder at the point $P_{max}$ occurs. $T_u$, the average temperature of the not yet combusted or unburned portion of the charge within the combustion chamber, can be determined by the following equation.

$$T_u = \frac{1.05*\dot{m}_c}{1.05*\dot{m}_c - \alpha \cdot \dot{m}_f \lambda_S}[0.05\beta T_{ex} + 0.95 T_{im}]\left(\frac{P_{max} - \Delta P}{P_{im}}\right)^{\frac{r-1}{r}} \qquad [18]$$

$\dot{m}_f$ is the fuel mass flow, and can be determined either from a known fuel rail pressure in combination with known properties and operation of the fuel injectors or from $\dot{m}_c$ and $\dot{m}_a$. $\alpha$ and $\beta$ are calibrations based on engine speed and load and may be developed experimentally, empirically, predictively, through modeling or other techniques adequate to accurately predict engine operation, and a multitude of calibration curves might be used by the same engine for each cylinder and for different engine settings, conditions, or operating ranges. $\lambda_S$ is the stoichiometric air-fuel ratio for the particular fuel and includes values well known in the art. $T_{ex}$ is a measured exhaust gas temperature. $T_{im}$ and $P_{im}$ are temperature and pressure readings taken at the intake manifold. $P_{max}$-$\Delta P$ describes the pressure in the combustion chamber just before the start of combustion. $\gamma$ is a specific heat constant described above. $T_b$, the average temperature of the combusted or burned portion of the charge within the combustion chamber, can be determined by the following equation.

$$T_b = \frac{T_a - (1-x_b)T_u}{x_b}, \qquad [19]$$

$$x_b = \frac{\alpha \cdot \dot{m}_f(1+\lambda_S)}{1.05 \dot{m}_c}$$

Note that the above equations are simplified in a method well known in the art by neglecting heat loss to cylinder wall. Methods to compensate for this simplification are well known in the art and will not be described in detail herein. Through the use of the aforementioned relationships and derivations, cylinder pressure and other readily available sensor readings can be used to determine a number of parameters descriptive of the combustion process being monitored.

Figure 26:
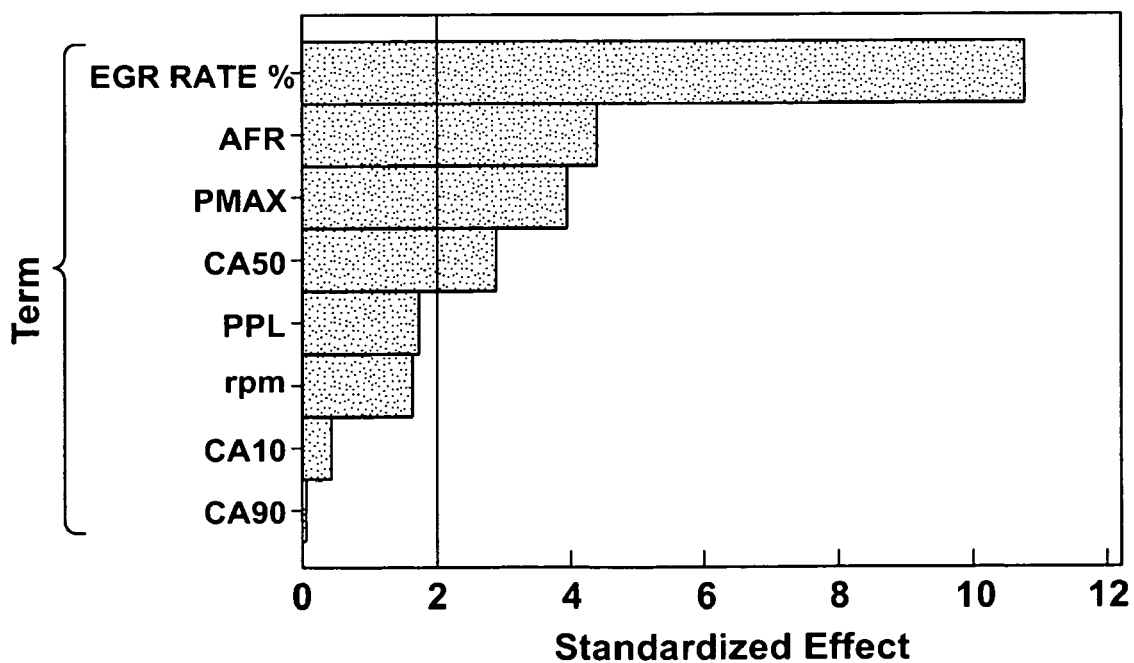
FIG. 26 is a graphical depiction of exemplary modeled results describing standardized effects of a number of inputs to NOx emissions under a given set of conditions, in accordance with the present disclosure.

As described above, cylinder pressure readings can be used to describe a state of combustion occurring within the combustion chamber for use as a factor in estimating NOx creation. Also as described above, a number of other factors are important to accurately estimating NOx creation. FIG. 26 is a graphical depiction of exemplary modeled results describing standardized effects of a number of inputs to NOx emissions under a given set of conditions, in accordance with the present disclosure. As described above, methods are known utilizing a model module and a NOx estimation module to simulate or estimate NOx creation based upon known characteristics of an engine. The model utilized to characterize NOx creation by a combustion process in this particular exemplary analysis can be characterized by the following expression.

$$NOx=NNT(P\text{max},CA50,CAp\text{ max},EGR\%,AFR) \qquad [20]$$

As shown in the graphical results of FIG. 26, a number of factors have varying effects on NOx creation. Under this particular set of conditions, EGR % has the largest impact upon NOx creation for the engine modeled. In this instance, by methods well known in the art, recirculating a particular amount of exhaust gas back into the combustion chamber through the EGR circuit lowers the adiabatic flame temperature of the combustion process, thereby lowering the temperatures that nitrogen and oxygen molecules are exposed to during combustion and, thereby, lowering the rate of NOx creation. By studying such models under various engine operating conditions, the neural network can be provided with the most useful inputs to provide accurate estimates of NOx creation. Additionally, studying such models provides information useful to selecting input data to initially train the neural network, varying inputs and providing corresponding outputs to sensor inputs and descriptive parameters most likely to impact NOx creation.

Figure 27:
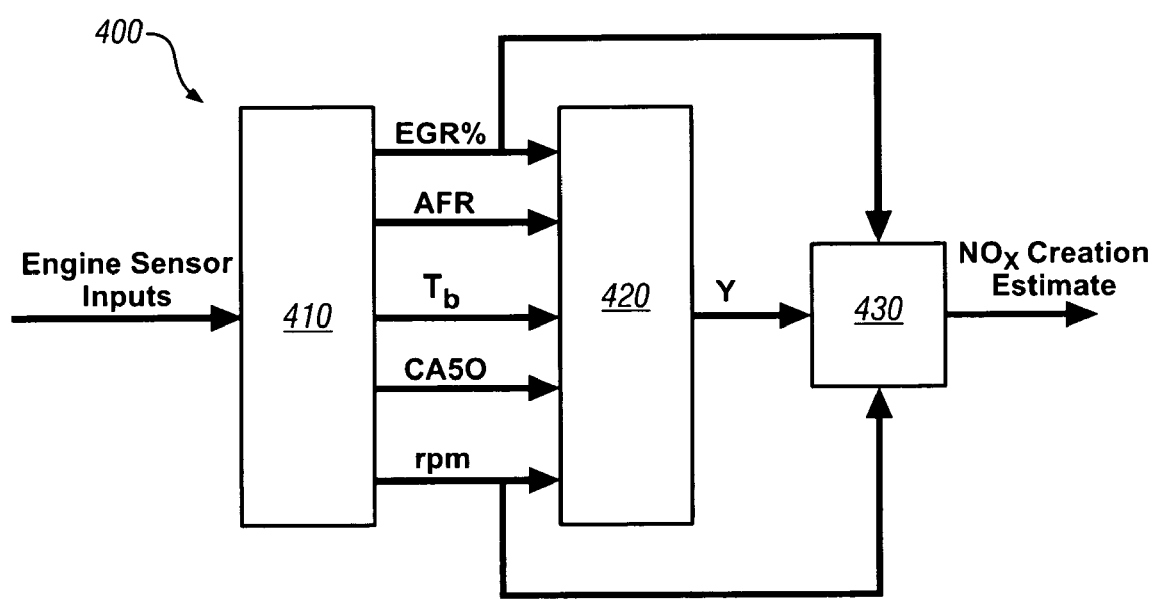
FIG. 27 schematically depicts an exemplary system generating a NOx creation estimate, utilizing models within a neural network to generate NOx creation estimates and including a dynamic model module to compensated NOx creation estimates for the effects of dynamic engine and vehicle conditions, in accordance with the present disclosure.

By methods described above, NOx creation estimates can be generated for a set of engine sensor inputs. As will be appreciated by one having ordinary skill in the art, equations and model predictions of engine operation frequently operate most effectively when the engine is operating at or near steady state However, observations and predictions can be made regarding the effects of transient or dynamic engine operation upon NOx creation estimates or the accuracy thereof. An exemplary expression describing a dynamic model or dynamic filtering module is shown by the following:

$$\frac{dNOx}{dt} = f(NOx, y, EGR\%, AFR, Ta, RPM) \qquad [21]$$

wherein contemporary NOx readings and an output y from a trained neural network are utilized to estimate a change in NOx creation. Such a change variable can be used to incrementally estimate NOx creation or can be used to check or filter NOx creation estimations. FIG. 27 schematically depicts an exemplary system generating a NOx creation estimate, utilizing models within a neural network to generate NOx creation estimates and including a dynamic model module to compensated NOx creation estimates for the effects of dynamic engine and vehicle conditions, in accordance with the present disclosure. NOx creation estimate system 400 comprises a model module 410, a neural network module 420, and a dynamic model module 430. Factors under current operating conditions most likely to impact NOx creation estimation under dynamic or changing conditions can be determined experimentally, empirically, predictively, through modeling or other techniques adequate to accurately predict engine operation. Inputs relating to these factors are fed to dynamic model module 430 along with output from neural network module 420, and the raw output from the neural network can be adjusted, filtered, averaged, de-prioritized or otherwise modified based upon the projected effects of the dynamic conditions determined by dynamic model module 430. In this way, the effects of dynamic engine or vehicle operation conditions can be accounted for in the estimation of NOx creation.

As described above, integration can be used as a low pass filter in the comparison of an actual conversion efficiency to a malfunction conversion efficiency. Data generated can frequently be choppy with a number of spikes. Interpretation of the various signals, especially a comparison of the various predicted NOx values at any given time, is prone to misinterpretation or false identifications. Comparison of the data curves generated through integration is greatly simplified, and the potential for misinterpretation or false identifications in a comparison are greatly reduced.

As described above, determination of conversion efficiency can be helpful to operate ammonia generation cycles. Conversion efficiency is described as the efficiency with which an aftertreatment device can convert NOx into other molecules. The exemplary aftertreatment system described above describes a measured or estimated NOx content of the exhaust gas flow measured upstream of the aftertreatment device being analyzed. This measure of NOx entering the aftertreatment system can be described at any time t as x(t). The exemplary aftertreatment system described above describes a measured or estimated NOx content of the exhaust gas flow measured downstream of the aftertreatment device being analyzed. This measure of NOx exiting the aftertreatment system can be described at any time as y(t). Conversion efficiency at any given time by the following equation.

$$\eta_{ACTUAL}(t) = 1 - \frac{y(t)}{x(t)} \quad [22]$$

It will be appreciated that this equation provides the conversion efficiency at any instant in time. Such instantaneous measurements or calculations are prone to error based upon signal noise. Methods to apply a low pass filter are known in the art. An integration of x(t) or y(t) yields a description of a quantity of actual NOx to enter or exit the aftertreatment system through a time period, respectively. An exemplary equation to determine an integrated conversion efficiency, filtering anomalous measurements in x(t) and y(t), can be described as follows.

$$\eta_{ACTUAL} = 1 - \frac{\int y(t) * dt}{\int x(t) * dt} \quad [23]$$

In this way, measured or estimated values of NOx entering and exiting the aftertreatment system can be utilized to determine an estimated or calculated actual conversion efficiency of the aftertreatment system.

A properly operating or fresh aftertreatment device operates with some maximum achievable conversion efficiency for a given set of conditions. However, it will be appreciated that aftertreatment devices, particularly devices utilizing a catalyst, are subject to degraded performance over time and in particular with exposure to high temperatures. Identifying a malfunction catalyst is important to maintaining low NOx emissions and continued enablement of fuel efficient engine operating modes.

Conversion efficiency in a fresh device is affected by a number of environmental or operational factors. Conversion efficiency for an exemplary SCR can be determined by a model expressed by the following function.

$$\eta = f(T_{BED}, SV, \theta_{NH_3}, x(t), V_{UREA}, \rho_{CELL}) \quad [24]$$

$T_{BED}$ describes the temperature of the catalyst bed within the SCR. This temperature can be directly measured or can be estimated based upon temperature, flow rate, and other properties of the exhaust gas flow. SV describes the surface velocity of exhaust gas flowing through the SCR device and can be determined as a function of properties of the exhaust gas flow, including temperature and flow rate. $\theta_{NH_3}$ describes an amount of ammonia storage on the catalyst bed, and adequate presence of ammonia on the SCR is required to achieve the desired NOx conversion reaction. $\theta_{NH_3}$ can be estimated, for example, by analyzing ammonia adsorbtion and desorbtion rates, NOx conversion rates, and adsorbed ammonia oxidation rates. As described above, x(t) describes the presence of NOx in the exhaust gas flow entering the aftertreatment system. Low levels of NOx are easily reacted within a properly functioning SCR, while levels of NOx above a certain threshold are more difficult to react and correspond to lower conversion efficiencies. An example of a factor limiting treatment of NOx above certain quantities includes limited ammonia present in an SCR. $V_{UREA}$ describes the volume of urea injected. While $V_{UREA}$ describes a presence of ammonia similarly to $\theta_{NH_3}$, $V_{UREA}$ includes a present measure of urea being injected and can better describe transient indicator for ammonia expected to be present in the near future. $\rho_{CELL}$ describes the density of catalyst material within the SCR and, therefore, describes a capacity of the SCR to catalyze the intended reaction.

The above model describing conversion efficiency includes factors which can be assumed or confirmed in normal operation of an SCR. As a result, the model can be simplified, thereby reducing a processing load required to analyze conversion efficiency through the model. For example, a $V_{UREA}$ can be monitored through operation of the urea dosing module, and given $V_{UREA}$ values in a particular intended range, the resulting conversion efficiency calculations should remain unaffected. In some embodiments, $V_{UREA}$ is controlled to be substantially directly proportional to x(t). Additionally, $\theta_{NH_3}$ can in some embodiments be estimated based upon $V_{UREA}$, monitored characteristics of the exhaust gas flow and of the SCR, such as temperature, and x(t). Given $\theta_{NH_3}$ values in a normal range, $\theta_{NH_3}$ can be reduced to a portion of the functional model dependent upon $T_{BED}$. A value for x(t), as described above, can be monitored through an upstream NOx sensor or a virtual NOx sensor. $\rho_{CELL}$ is a characteristic of the SCR device and is a known value. As a result of these known or estimable factors, conversion efficiency for an exemplary SCR can be determined by a model expressed by the following function.

$$\eta = f(T_{BED}, SV, \theta_{NH_3}) \quad [25]$$

In this way, conversion efficiency of the SCR can be accurately determined as an on board diagnostic function by maintaining other factors within known or calibrated ranges.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a powertrain comprising an internal combustion engine including a combustion chamber and an aftertreatment system including a selective catalytic reduction device utilizing ammonia as a reductant, said method comprising:
   selectively initiating an ammonia generation cycle comprising
      injecting fuel into the combustion chamber before a primary combustion event to a calibrated air fuel ratio in a range lean of stoichiometry based upon generation of NOx within the combustion chamber, and
      injecting fuel into the combustion chamber after the primary combustion event based upon an overall air fuel ratio in a range rich of stoichiometry and a resulting generation of molecular hydrogen; and
   utilizing a catalyst device between the engine and the selective catalytic reduction device to produce ammonia.

2. The method of claim 1, wherein injecting fuel into the combustion chamber after the primary combustion event results in reformation of the injected fuel within the combustion chamber.

3. The method of claim 2, wherein the reformation of the injected fuel within the combustion chamber is incomplete; and
   said method further comprises reforming a portion of the injected fuel on a hydrogen forming catalyst between the engine and the catalytic device.

4. The method of claim 3, wherein the reformation of the injected fuel within the combustion chamber and the reforming the portion of the injected fuel on a hydrogen forming catalyst are controlled by adjusting a timing of injecting fuel into the combustion chamber after the primary combustion event.

5. The method of claim 2, wherein injecting fuel into the combustion chamber after the primary combustion event resulting in reformation of the injected fuel within the combustion chamber is performed selectively;
   said method further comprising selectively reforming injected fuel on a hydrogen forming catalyst; and
   wherein selectively reforming injected fuel within the combustion chamber and selectively reforming injected fuel on the hydrogen forming catalyst are selectively alternatively implemented.

6. The method of claim 5, wherein selectively reforming injected fuel on the hydrogen forming catalyst comprises injecting fuel into the combustion chamber.

7. The method of claim 5, wherein selectively reforming injected fuel on the hydrogen forming catalyst comprises injecting fuel into the aftertreatment system.

8. The method of claim 1, wherein the overall air fuel ratio in a range rich of stoichiometry is based upon producing a desired ratio of hydrogen molecules to NO molecules.

9. The method of claim 8, wherein the desired ratio of hydrogen molecules to NO molecules is between 3:1 and 5:1.

10. The method of claim 1, wherein selectively initiating the ammonia generation cycle is based upon an estimated ammonia storage within the selective catalytic reduction device.

11. The method of claim 1, wherein selectively initiating the ammonia generation cycle is based upon engine load.

12. The method of claim 11, wherein selectively initiating the ammonia generation cycle based upon engine load is predictively scheduled based upon predictive data describing anticipated operation of the powertrain.

13. The method of claim 1, wherein the powertrain further comprises a hybrid powertrain comprising an electric torque generative device; and
   said method further comprising modulating an engine load to a preferred engine load during the ammonia generation cycle.

14. The method of claim 1, wherein the powertrain further comprises a hybrid powertrain comprising an electric torque generative device; and
   said method further comprising modulating an engine load to a preferred engine load based upon avoiding ammonia slippage in the selective catalytic reduction device.

15. Method for controlling a powertrain comprising an internal combustion engine including a combustion chamber and an aftertreatment system including a selective catalytic reduction device utilizing ammonia as a reductant, said method comprising:
   selectively initiating an ammonia generation cycle comprising
      injecting fuel into the combustion chamber before a primary combustion event to a calibrated air fuel ratio based upon generation of NOx within the combustion chamber, and
      injecting fuel into the combustion chamber after the primary combustion event based upon an overall air fuel ratio within the combustion chamber and resulting generation of molecular hydrogen within the combustion chamber, wherein the overall air fuel ratio is set to generate molecular hydrogen at a desired ratio to the generation of NOx; and
   wherein selectively initiating the ammonia generation cycle is based upon ammonia usage within the selective catalytic reduction device.

16. Apparatus for controlling a powertrain comprising an internal combustion engine including a combustion chamber and emitting an exhaust gas flow and an aftertreatment system including a selective catalytic reduction device utilizing ammonia as a reductant, said apparatus comprising:
   an ammonia generation catalyst within the aftertreatment system between the engine and the selective catalytic reduction device facilitating production of ammonia from molecular hydrogen and NO present in the exhaust gas flow; and
   a control module configured to
      selectively initiate an ammonia generation cycle comprising
         injecting fuel into the combustion chamber before a primary combustion event to a calibrated air fuel ratio based upon generation of NOx within the combustion chamber, and
         injecting fuel into the combustion chamber after the primary combustion event based upon an overall air fuel ratio within the combustion chamber and a resulting generation of the molecular hydrogen from reformation of the injected fuel.

17. The apparatus of claim 16, wherein injecting fuel into the combustion chamber after the primary combustion event includes injection timing to facilitate reforming within the combustion chamber.

18. The apparatus of claim 16, further comprising a direct injection fuel injection system.

19. The apparatus of claim 16, wherein the control module is further configured to monitor ammonia usage within the selective catalytic reduction device; and
   wherein selective initiation of the ammonia generation cycle is based upon the monitoring of ammonia usage within the selective catalytic reduction device.

20. The apparatus of claim 19, wherein monitoring the ammonia usage within the selective catalytic reduction device comprises estimating ammonia storage within the selective catalytic reduction device.

21. The apparatus of claim 19, wherein monitoring the ammonia usage within the selective catalytic reduction device comprises estimating ammonia slippage within the selective catalytic reduction device.

22. The apparatus of claim 19, wherein monitoring the ammonia usage within the selective catalytic reduction device comprises monitoring NOx breakthrough past the selective catalytic reduction device.

23. The apparatus of claim 16, further comprising a hydrogen forming catalyst within the aftertreatment system.

24. The apparatus of claim 23, wherein the ammonia generation catalyst and the hydrogen producing catalyst are located within a unitary device.

25. The apparatus of claim 24, wherein the unitary device is a particulate filter.

26. The apparatus of claim 23, wherein the hydrogen forming catalyst is located proximate to a particulate filter.

27. The apparatus of claim 16, wherein the selective catalytic reduction device is located proximate to a particulate filter.

28. The apparatus of claim 16, further comprising a urea injection system; and wherein the control module is further configured to coordinate the urea injection system and the ammonia generation cycle.

\* \* \* \* \*